US012697629B2

(12) United States Patent
Giusti et al.

(10) Patent No.: US 12,697,629 B2
(45) Date of Patent: Aug. 4, 2026

(54) MICROFLUIDIC DEVICE FOR SPRAYING VERY SMALL DROPS OF LIQUIDS

(71) Applicant: STMICROELECTRONICS S.R.L., Agrate Brianza (IT)

(72) Inventors: Domenico Giusti, Caponago (IT); Gianluca Gulli', Sesto San Giovanni (IT); Francesco Ferrario, Verano Brianza (IT); Davide Maerna, Agrate Brianza (IT); Lorenzo Tentori, Verano Brianza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 1040 days.

(21) Appl. No.: 17/845,718

(22) Filed: Jun. 21, 2022

(65) Prior Publication Data

US 2022/0410183 A1 Dec. 29, 2022

(30) Foreign Application Priority Data

Jun. 23, 2021 (IT) ........................ 102021000016508

(51) Int. Cl.
*B05B 1/08* (2006.01)
*B05B 1/14* (2006.01)
*B05B 1/24* (2006.01)

(52) U.S. Cl.
CPC .................. *B05B 1/08* (2013.01); *B05B 1/14* (2013.01); *B05B 1/24* (2013.01)

(58) Field of Classification Search
CPC .... B05B 1/08; B05B 1/14; B05B 1/24; B05B 17/0638; B05B 17/0607; B05B 11/0054; B05B 12/04
See application file for complete search history.

(56) References Cited

U.S. PATENT DOCUMENTS

| | | | | |
|---|---|---|---|---|
| 5,383,597 | A * | 1/1995 | Sooriakumar | F02M 61/162 239/584 |
| 6,209,203 | B1 * | 4/2001 | Murthy | B41J 2/162 29/890.1 |
| 6,352,209 | B1 * | 3/2002 | Skeath | B05B 15/40 239/8 |

(Continued)

FOREIGN PATENT DOCUMENTS

| | | | |
|---|---|---|---|
| CN | 1847002 | A | 10/2006 |
| CN | 101376286 | A | 3/2009 |

(Continued)

*Primary Examiner* — Christopher R Dandridge
(74) *Attorney, Agent, or Firm* — Seed Intellectual Property Law Group LLP

(57) ABSTRACT

A microfluidic device has a chamber; a fluidic access channel in fluidic connection with the chamber; a plurality of nozzle apertures in fluidic connection with the chamber; and an actuator, operatively coupled to the fluid containment chamber and configured to cause ejection of drops of fluid through the nozzle apertures in an operating condition of the microfluidic device. The chamber has an elongated shape, with a length and a maximum width, wherein an aspect ratio between the length and the maximum width of the chamber is at least 3:1. The nozzle apertures are configured to generate, in use, a plurality of drops having a total drop volume, wherein a ratio total drop volume to a chamber volume is at least 15%.

19 Claims, 15 Drawing Sheets

(56) References Cited

U.S. PATENT DOCUMENTS

| | | | |
|---|---|---|---|
| 6,718,632 | B2 | 4/2004 | Liu et al. |
| 6,964,467 | B2 | 11/2005 | Kaneko et al. |
| 7,305,764 | B2 | 12/2007 | Kitahara |
| 7,641,317 | B2 | 1/2010 | Matsui et al. |
| 7,712,878 | B2 | 5/2010 | Takabe et al. |
| 7,784,904 | B2 | 8/2010 | Ide et al. |
| 8,096,643 | B2 * | 1/2012 | Olbrich ................ B41J 2/14112 347/62 |
| 9,174,445 | B1 | 11/2015 | Prati et al. |
| 9,399,718 | B2 | 7/2016 | Ikeda et al. |
| 9,469,109 | B2 | 10/2016 | Faralli et al. |
| 9,630,419 | B2 | 4/2017 | Hong et al. |
| 11,117,156 | B2 | 9/2021 | Giusti et al. |
| 12,365,001 | B2 | 7/2025 | Giusti et al. |
| 2002/0154191 | A1 | 10/2002 | Kanda et al. |
| 2006/0143914 | A1 | 7/2006 | Bergstrom et al. |
| 2008/0239017 | A1 | 10/2008 | Takabe et al. |
| 2009/0009565 | A1 | 1/2009 | Oh et al. |
| 2009/0309935 | A1 | 12/2009 | Koseki |
| 2014/0313264 | A1 | 10/2014 | Cattaneo et al. |
| 2015/0224784 | A1 | 8/2015 | Hong et al. |
| 2015/0367014 | A1 | 12/2015 | Gruenbacher et al. |
| 2015/0367356 | A1 | 12/2015 | Gruenbacher et al. |
| 2015/0367641 | A1 | 12/2015 | Giusti et al. |
| 2018/0141074 | A1 * | 5/2018 | Giusti ..................... B05B 9/002 |
| 2018/0236445 | A1 * | 8/2018 | Giusti .................. B41J 2/14201 |
| 2019/0350260 | A1 | 11/2019 | Di Marco et al. |
| 2019/0358955 | A1 | 11/2019 | Giusti et al. |
| 2021/0346906 | A1 | 11/2021 | Giusti et al. |

FOREIGN PATENT DOCUMENTS

| | | | |
|---|---|---|---|
| CN | 104769053 | A | 7/2015 |
| CN | 104781077 | A | 7/2015 |
| EP | 1671794 | A1 | 6/2006 |
| JP | 2002036545 | A | 2/2002 |
| JP | 2003154665 | A | 5/2003 |
| WO | WO 2004085835 | A1 | 10/2004 |
| WO | 2012029678 | A1 | 3/2012 |
| WO | 2020023196 | A1 | 1/2020 |

* cited by examiner

FIG. 14
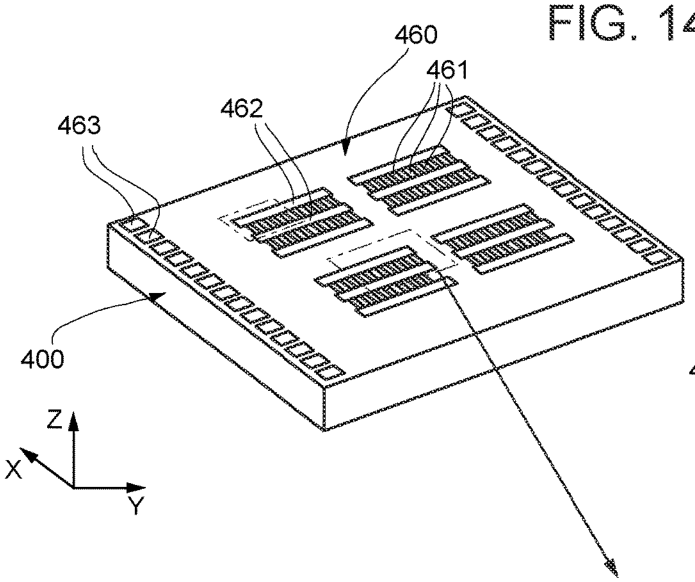
FIG. 16
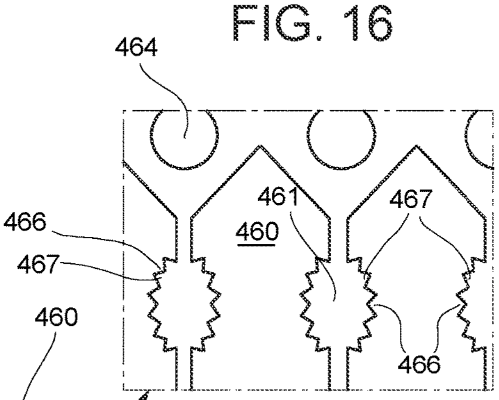
FIG. 15
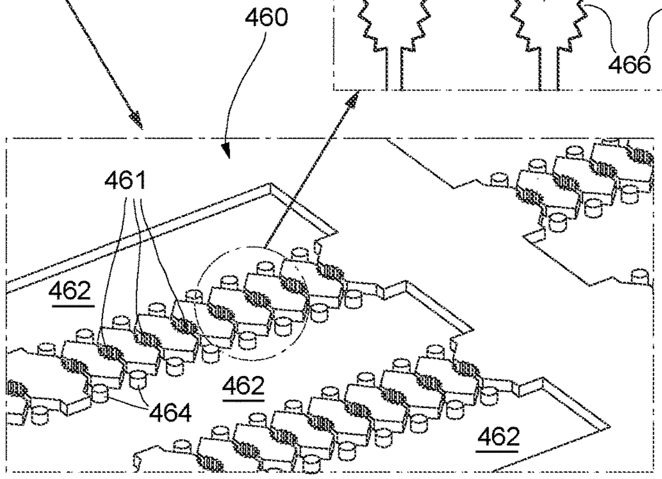
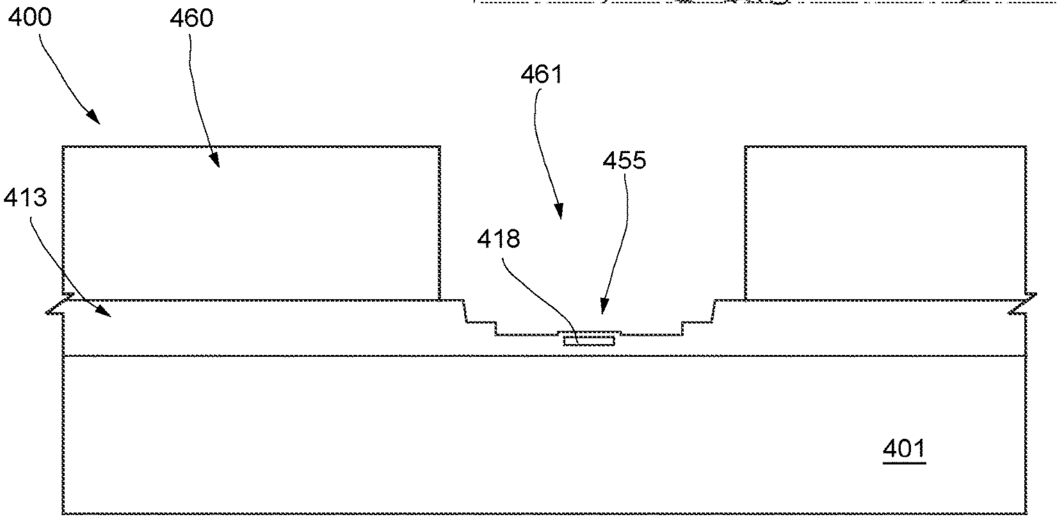
FIG. 17

FIG. 18
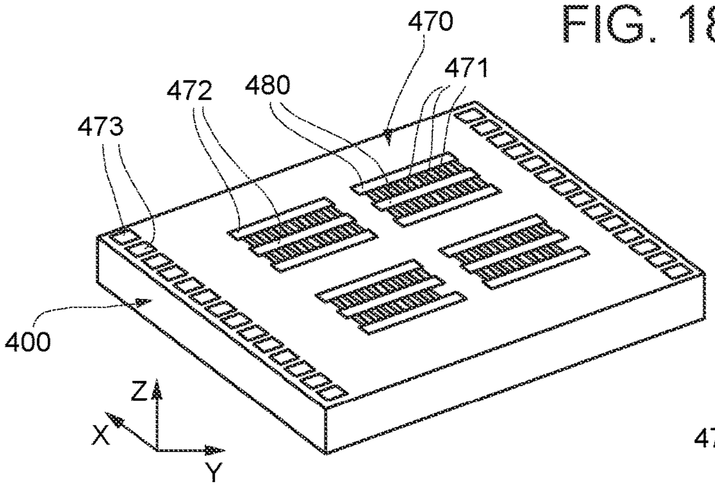
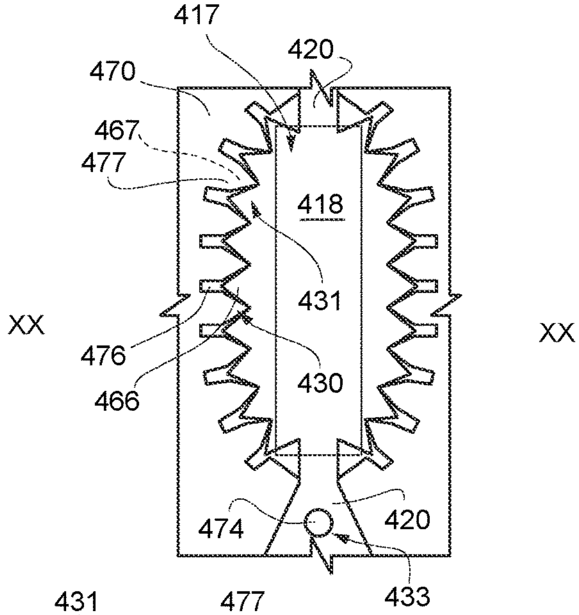
FIG. 19
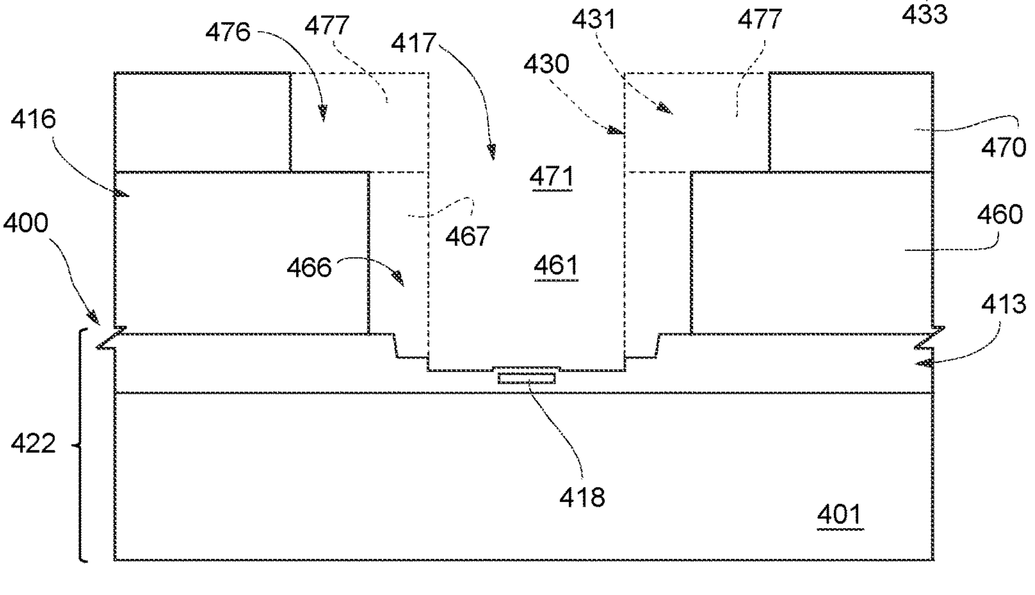
FIG. 20

MICROFLUIDIC DEVICE FOR SPRAYING VERY SMALL DROPS OF LIQUIDS

BACKGROUND

Technical Field

The present disclosure relates to an improved microfluidic device for spraying very small drops of liquids.

Description of the Related Art

As is known, for spraying inks and/or perfumes as well as in e-cigarettes or in inhalation medical devices, the use has been proposed of microfluidic devices of small dimensions, which may be obtained with microelectronic manufacturing techniques.

The delivery of known or unknown composition fluid is feasible with modified design, ink jet structures, described for example in US 2015/367014, US 2014/14310633 (corresponding to U.S. Pat. No. 9,174,445), US 2015/0367356 or US 2015/367641.

In addition, WO 2004/085835A1 discloses a liquid ejecting apparatus and a manufacturing method thereof using a PZT bulk technology, wherein a thick metal plate is worked to form liquid passages and a chamber and a piezoelectric/electrostrictive element is fixed to the metal plate. Ejection is obtained by the piezoelectric/electrostrictive element that generates a pressure wave.

Another piezoelectric inkjet head is disclosed in US 2009/009565. However, in some applications, such as in nebulizer applications, it is desired to spray drops of very small dimensions, as small as 1 μm. However, current semiconductor technologies allow manufacture of nozzles with diameters greater than 6 μm.

To solve this issue, for example, US2018/0141074 discloses a microfluidic device formed in a body accommodating a fluid containment chamber. An exemplary embodiment is shown in FIGS. 1 and 2. Here, a chamber 1 formed in a body 5 is coupled to a fluid access channel 2 and to a drop emission channel or nozzle 3 formed in a nozzle plate (not visible, overlying the chamber 1). The drop emission channel 3 overlies the chamber 1 and is partially offset thereto, to define an intersection area 4 having smaller dimension than the hole area and thus defining an effective exit area. A heater 8 is formed in the body 5 under the chamber 1 and is configured to heat the fluid in the chamber 1 so as to generate a drop that is emitted through the drop emission channel 3.

Thus, small drops may be obtained. In particular, the dimensions of the drops (diameter/volume) are directly linked to the nozzle diameter, as shown in FIG. 2 plotting the volume of the emitted drops as a function of the diameter of the nozzle (the effective exit area in FIG. 1).

US 2019/350260 discloses a similar microfluidic dispenser wherein small drops are obtained using offset nozzles openings having different shapes and arranged at different positions.

This solution has been successful in reducing the dimensions of the emitted drops but has caused further challenges regarding the operation of the device, in particular when it is desired to spray a high number of very small drops with high frequency.

In particular, for obtaining a sufficient volume of emitted fluid, test structures comprising a plurality of apertures arranged on the periphery of the chamber have been studied. However, it has been seen that this architecture may not be thermally efficient.

In fact, for example, microfluidic devices with peripheral offset nozzles with a diameter of 6 μm, configured to obtain drops of about 0.28 pL (picoliters) have been studied. This results in a drop volume that is less than 1% of the chamber volume, and thus of fluid contained in the chamber (for example, 50 pL). Therefore, a much higher volume of fluid is heated than the volume of the actually ejected fluid. Consequently, it has been observed that heat energy builds up very quickly in the chamber and may cause the die, accommodating a plurality of adjacent chambers, to overheat.

In some cases, boiling of the fluid has been observed even before it enters the chambers, globally depriming the system. Therefore, in devices comprising many chambers each connected to a plurality of nozzles, with ignition at high frequency (even higher than 1 kHz), the risk of a failure of the entire device due to global depriming exists. In addition, depriming may occur very quickly, destroying the device.

Various embodiments of the present disclosure provide an improved microfluidic device solving the problems of the prior art.

BRIEF SUMMARY

According to the present disclosure, there are provided a microfluidic device and a manufacturing process thereof.

BRIEF DESCRIPTION OF THE SEVERAL VIEWS OF THE DRAWINGS

For the understanding of the present disclosure, embodiments thereof are now described, purely as a non-limitative example, with reference to the enclosed drawings, wherein:

FIG. 14 shows a top perspective view of the microfluidic device of FIG. 11, in a subsequent manufacturing step;

FIG. 15 is a perspective view of a part of FIG. 14, in greater scale;

FIG. 16 shows in top plan view an enlarged detail of FIG. 15; vFIG. 17 is a cross-section of the same portion of FIG. 13, at the manufacturing step of FIG. 14;

FIG. 18 shows a top perspective view of the microfluidic device of FIG. 14, in a subsequent manufacturing step;

FIG. 19 is an enlarged top plan view of a portion of the microfluidic device of FIG. 18;

FIG. 20 is a cross-section of the same portion of FIG. 17, at the manufacturing step of FIG. 18 and taken along section line XX-XX of FIG. 19;

DETAILED DESCRIPTION

Hereinbelow, embodiments of a microfluidic device will be described in detail. In the ensuing description, spatial indications such as “upper”, “lower”, “on”, “over”, “under”, “top”, “bottom”, and so on are to be interpreted according to the discussed Figures and are not limitative.

Figure 4:
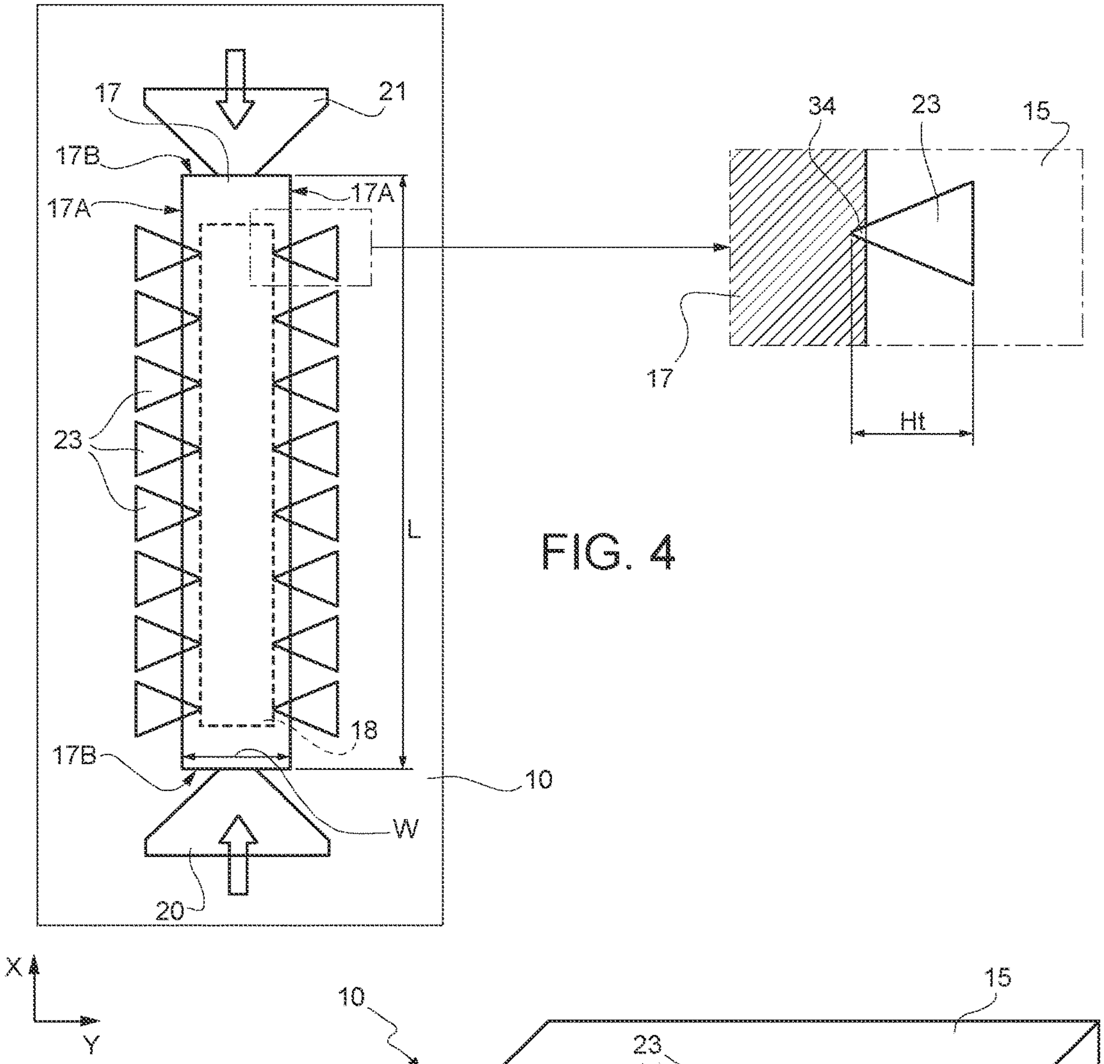
FIG. 4 is a simplified top plan view, with transparent parts, of the cell of FIG. 3.
Figure 3:
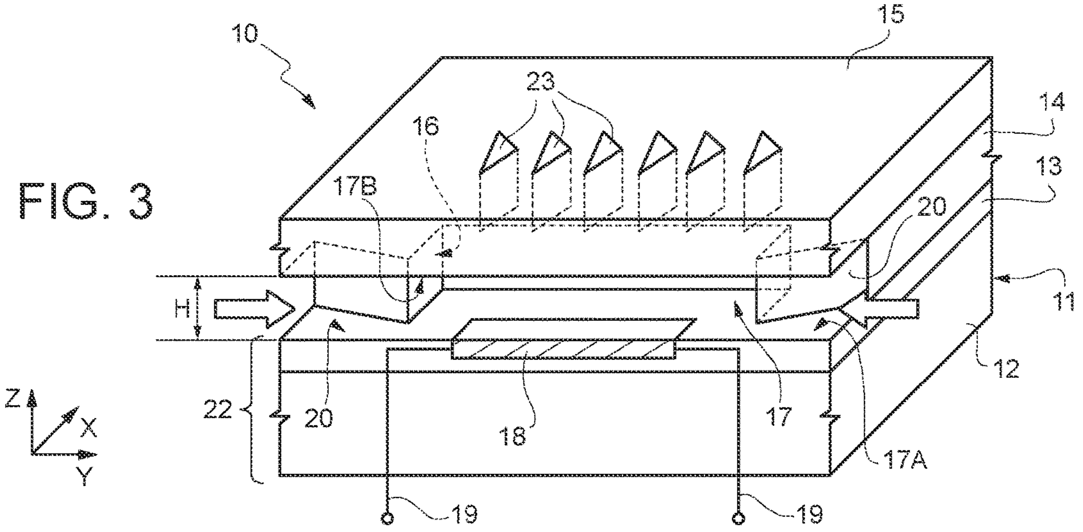
FIG. 3 is a simplified perspective section view of one embodiment of a chamber of the present microfluidic device.

FIGS. 3-4 show a microfluidic device 10 manufactured using micro-manufacturing steps, as discussed more in detail hereinafter.

The microfluidic device 10 has a general structure shown in FIG. 3 and is formed in a body 11 including a substrate 12, an insulating layer 13, a chamber layer 14, and a nozzle layer 15.

The substrate 12, the insulating layer 13, the chamber layer 14 and the nozzle layer extend over each other in a height direction, parallel to a vertical axis (first axis Z of a Cartesian reference system XYZ).

The substrate 12 is for example of semiconductor material, such as monocrystalline silicon. The insulating layer 13 is for example a multilayer including silicon oxide, silicon nitride and other insulating layers. The substrate 12 and the insulating layer form a base body portion 22. The chamber layer 14 is for example a polymeric material such as dry film. The nozzle layer 15 may be formed by semiconductor material, such as monocrystalline silicon or a polymeric material such as dry film, as discussed hereinbelow. The chamber layer 14 forms a plurality of chambers 17, one chamber 17 being shown in FIGS. 3 and 4. The chambers 17 are laterally delimited by lateral walls 16 formed by the chamber layer 14; in addition, the chambers 17 are delimited by a bottom base 17A formed by the insulating layer 13 and by an upper base 17B formed by the nozzle layer 15. The bottom base 17A and upper base 17B extend along a first direction and a second direction, respectively, the second direction transverse to the first direction.

The insulating layer 13 accommodates a plurality of actuators, here heaters 18 (one shown). The heaters 18 are arranged below the chambers 17, one heater 18 for each chamber 17. However, in the alternative, more heater portions 18 may be arranged under each chamber 17.

Each heater 18 is coupled to a firing circuit, not shown, through connection lines 19.

Inlets 20 extend through the chamber layer 14 from opposite sides of the chamber 17. The inlets 20 connect the chamber 17 with a fluid supply channel not shown here.

A plurality of nozzle openings 23 extend through the nozzle layer 17 along the periphery of each chamber 17. Specifically, as clearly visible in FIG. 4, the nozzle openings 23 partially overlay the chamber 17 and fluidically connect the chamber 17 with the outside of the microfluidic device 10, for the ejection of liquid drops.

Figure 1:
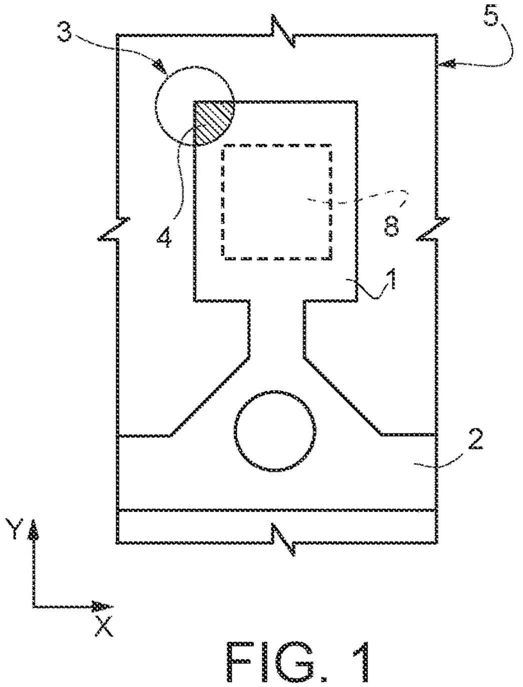
FIG. 1 is a simplified top plan view, with transparent parts, of a chamber of a microfluidic device.
Figure 2:
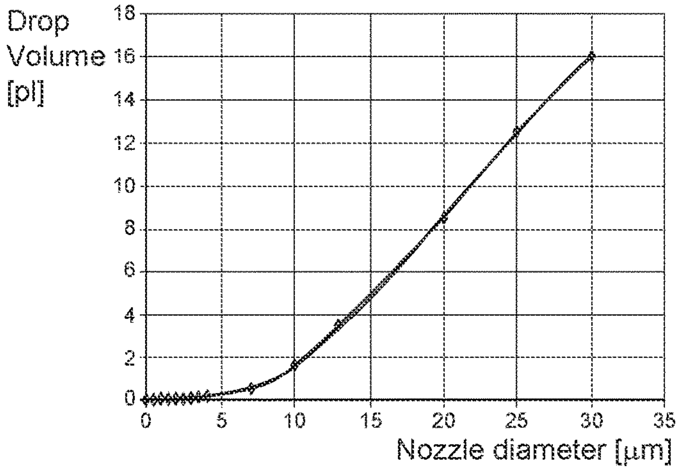
FIG. 2 is a plot representing the dependency of the volume of the drops on the nozzle diameter.

In order to reduce the exit area of the drops, as shown in the enlarged detail in FIG. 4, the nozzle openings 23 form each an intersection area 34 similar to intersection area 4 of FIG. 1.

In the embodiment shown in FIG. 4, the lateral walls 16 of the chamber 17 extend along a rectangle and the chamber 17 has a parallelepipedal shape with rectangular bottom base 17A, extending parallel to plane XY of the Cartesian reference system XYZ. In the top view of FIG. 4, the bottom base 17A of the chamber 17 has long sides much longer than the short sides.

In particular, the length of the long sides of the bottom base 17C is greater than twice the length of the short sides; in the embodiment shown in FIG. 4, the long sides of the rectangular bottom base 17C are four times longer than the short sides.

In the embodiment of FIG. 4, the inlets 20 open in the chamber 17 at the short sides of the chamber 17. The nozzle openings 23 extend adjacent and partially intersecting (e.g., overlapping) the long sides.

Figure 5:
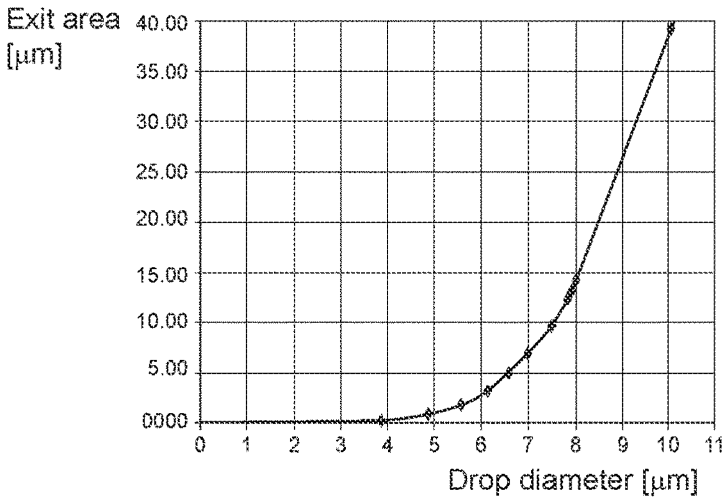
FIG. 5 is a plot representing the relationship between exit area and drop diameter, obtained experimentally.

The nozzle openings 23 are designed to have small intersection areas 34 in which the nozzle openings 23 and the chamber 17 overlap. Thereby, the drop volume is reduced, as visible from the plot of FIG. 5 showing the relationship between drop diameter and the effective exit area, that is the intersection area. Here, the interesting area is the one comprised between 0.2 and 0.5 $\mu m^2$.

In the shown example, the nozzle openings 23 have a triangular, almost isosceles shape, with an acute angle corner intersecting the chamber 17 and forming intersection area 34. Thereby, for a triangle height Ht (FIG. 4) of 6 μm, feasible with the present technology, an intersection area 34 of about 0.32 $\mu m^2$ may be obtained, and consequently, a drop volume of about 0.02 pl.

In the microfluidic device 10, the chamber 17 and the nozzle openings 23 are designed in order to have a volume ratio between drop volume and chamber volume that is higher than 15%.

From study of the Applicant, it has been observed that, by designing the chamber 17 so as to maximize its perimeter (thereby, to have a higher number of small nozzle openings 23) while reducing the volume of the chamber 17, less overheating is obtained.

In particular, it has been demonstrated that, with a volume ratio higher than 15%, a constant high flow of liquid from the inlets 20 to the nozzle openings 23 may be obtained, eliminating stationary liquid in the chamber 17 and thus chamber deprime.

For example, this may be obtained for a chamber 17 having a width W=6 μm, a length L=12 μm and thus a volume of 1008 $\mu m^3$, eight nozzle openings 23 (with a total volume of emitted drops of 0.16 pL). The same ratio may be obtained with chambers 17 having an area that is an entire multiple n of the base chamber area and a number of nozzle openings 23 equal to 4*n*:

| Number of base cells | Chamber volume ($\mu m^3$) | Chamber volume (pL) | Number of nozzle openings 23 | Total drop volume | Volume ratio % |
|---|---|---|---|---|---|
| 1-base cell | 504 | 0.50 | 4 | 0.08 | 15.9 |
| 2 | 1008 | 1.01 | 8 | 0.16 | 15.9 |
| 3 | 1512 | 1.51 | 12 | 0.24 | 15.9 |
| 4 | 2016 | 2.02 | 16 | 0.32 | 15.9 |
| 5 | 2520 | 2.52 | 20 | 0.40 | 15.9 |
| 6 | 3024 | 3.02 | 24 | 0.48 | 15.9 |

Figure 6:
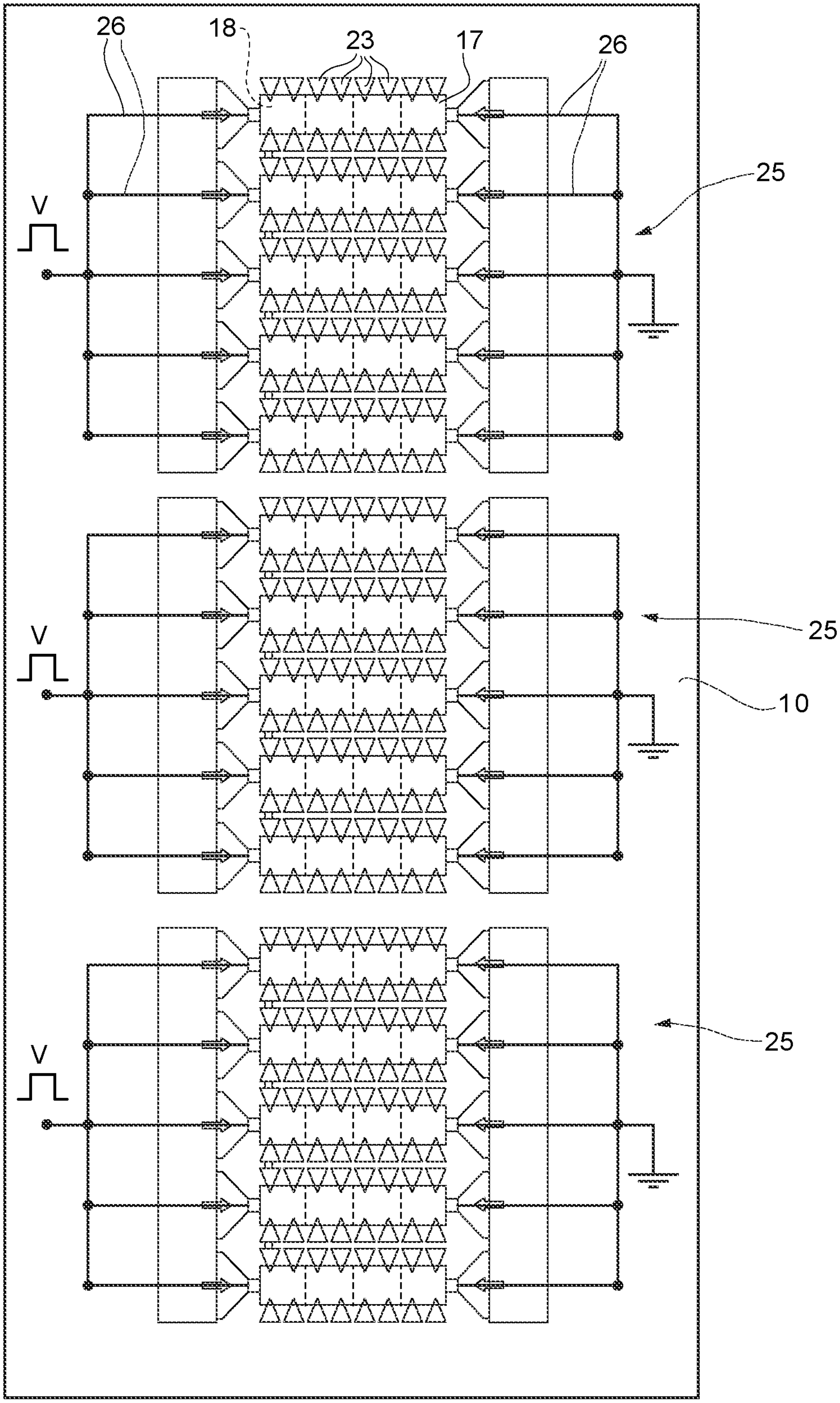
FIG. 6 is a simplified top plan view of a microfluidic device including a plurality of chambers.

FIG. 6 shows a device 10 including three groups of emitting portions 25, each formed by a plurality of chambers 17 (here five), adjacent to each other.

Here each chamber 17 is formed by four basic cells (as indicated by the dashed lines) and thus has sixteen nozzle openings 23.

The heaters 18 of the chambers 17 of a same group of emitting portions 25 are connected together, as indicated in FIG. 6 by lines 26. In particular, as shown, the heaters 18 of a same group of emitting portions 25 are coupled between a firing circuit, supplying firing pulses Vo, e.g., 10V, and ground.

According to an embodiment of the present microfluidic device, a small intersection area may be obtained by forming small dimension features in the lateral wall 16 of the chamber 17, instead of in the nozzle layer 15. In fact, Applicant's tests have shown that alignment of the nozzle openings 23 with respect to the chambers 17 may be sometimes difficult. In addition, in some instances, drilling of very small nozzle openings 23 in the nozzle layer 15, e.g., by laser, has been proved challenging and does not always bring to the formation of openings with constant dimension; in rare cases, partially closed nozzles were observed, thereby resulting in uneven intersection areas and not optimal behavior.

Specifically, according to this embodiment, the lateral wall 16 is not smooth and straight, but has a plurality of protrusions of very small dimensions. Each nozzle opening has here an area (in top plan view) comparable with the chamber area and extend almost entirely offset with respect to an adjacent chamber 17 except for at the chamber protrusions, thereby defining a plurality of nozzle apertures of very small area.

Figure 7:
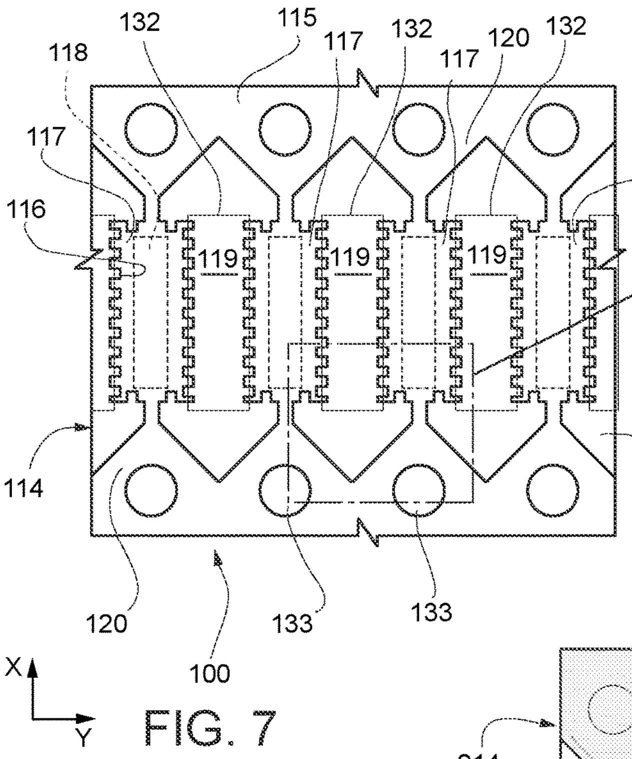
FIG. 7-10 are top plan views of different embodiments of a part of the present microfluidic device, with transparent parts.
Figure 8:
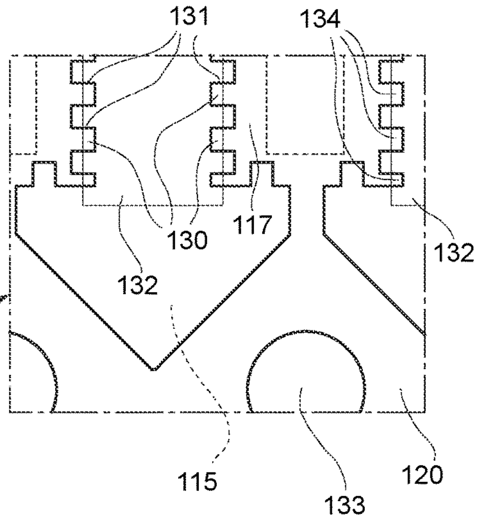
Figure 9:
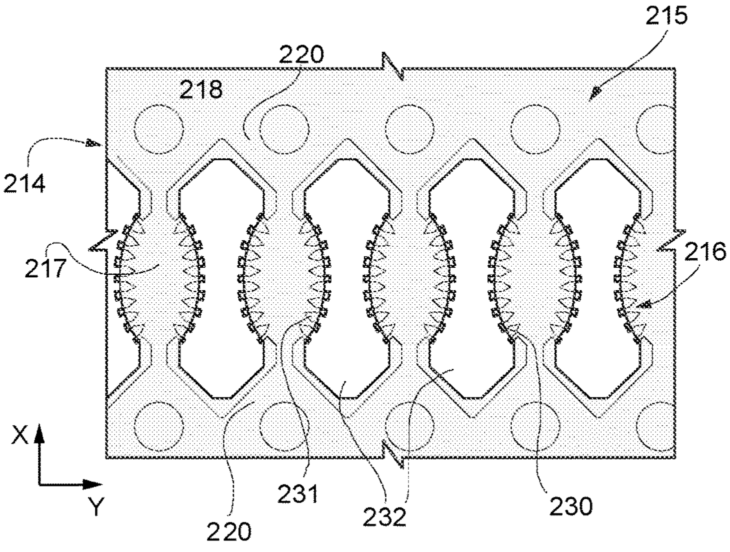

For example, FIGS. 7-9 show three different shapes of chambers and nozzle apertures that allow to obtain very small intersection areas in a simple way, using current macromachining techniques.

FIGS. 7 and 8 shows a microfluidic device 100 comprising a chamber layer 114.

Chamber layer 114 forms a plurality of chambers 117 (four visible) having here a generally rectangular area in top plan view (parallel to the plane XY). The chambers 117 are delimited by lateral walls 116 formed by the chamber layer 114. The lateral walls 116 of each chamber 17 form a plurality of protrusions 130 (FIG. 8) adjacent to each other, extending inside the chamber 117 and separated a corresponding plurality of indentations 131.

Heaters 118 extend below the chambers 117 and are represented by dotted lines.

The protrusions 130 have here a generally square shape, with sides, e.g., of about 2.5-2.6 μm.

A nozzle layer 115 (represented by hatched lines) extends on the chamber layer 114 and upwardly closes the chambers 117. The nozzle layer 115 has openings 132 offset to the chambers 117, but intersecting (e.g., overlapping) the indentations 131.

In particular, the openings 132 are vertically aligned to portions 119 of the chamber layer 114 extending between pairs of adjacent chambers 117.

In more detail, each nozzle opening 23 extends between two adjacent chambers 17 and intersects the indentations 131 of the two adjacent chambers 23 at two different portions of its periphery.

Thereby, the openings 23 may have a large area, even larger than the chambers; therefore they may be obtained in a simple way and with high size accuracy.

Here, also the openings 132 are rectangular in top plan view.

Thereby the openings 132 and the indentations 131 form intersection areas 134 (FIG. 8) of very small dimensions, and in particular, of a few $\mu m^2$.

For example, if the openings 132 extend up to almost the entire length of the indentations 131 (along a second axis Y of the Cartesian reference system XYZ, parallel to the width dimension of the chambers 117) an exit area of 1.5×2.6 $\mu m^2$ may be obtained for each cavity 131.

The intersection areas 134 are exit areas for a fluid contained in the chamber 117, in an operating condition of the microfluidic device 100. Thereby, the microfluidic device 100 is able to generate very small drops at each chamber 117 and, after application of a voltage pulse V to the heaters 118 (analogously to what shown in FIG. 6), an aerosol of many, very small drops is obtained.

By virtue of the elongated shape of the chambers 117 (here having a length, along a third axis X of the Cartesian reference system XYZ, that is about four times the width, along the second axis Y), a volume ratio greater than 15% may be obtained, thereby providing reliable operation of the microfluidic device 100, without overheating or depriming of the microfluidic device 100.

FIG. 7 also shows inlets 120 as well as pillars 133 formed in the inlets 120 to block any impurity possibly dragged by the entering liquid.

FIG. 9 shows a different shape of the chambers (here indicated by 217) and of the openings (here indicated by 232) in the nozzle layer 215.

Here the chambers 217 have a generally oval or elliptic base area. Also here, the chambers 217 are delimited by lateral walls 216 forming a plurality of adjacent protrusions 230 and a corresponding plurality of indentations 231. In addition, also here each chamber 217 has a greater dimension (length, measured along the third axis X) that is about twice the shorter dimension (width, measured along the second axis Y).

For example, the chambers 217 may have an elliptical shape with a first semiaxis length of 60 μm and a second semiaxis length of about 20 μm.

The heater, indicated here by 218, may have here again rectangular shape.

The protrusions 230 and the indentations 231 have here pointed tips.

A nozzle layer 215 (also represented by hatched lines) extends on the chamber layer 214 and has openings 232 that, in top plan view, are generally countershaped to the chambers 217. In particular, the openings 232 are elongated in a direction parallel to the third axis X and have an arcuate, concave shape. Thus, in different cross-sections taken along the third axis X, the width of openings 232 is decreasing from the end (near one inlet 220 of the chambers 217) toward a central portion of each opening 232, and then increasing again toward the other end. The openings 232 also here at least partially extend over the protrusions 230 and the indentations 231.

Figure 10:
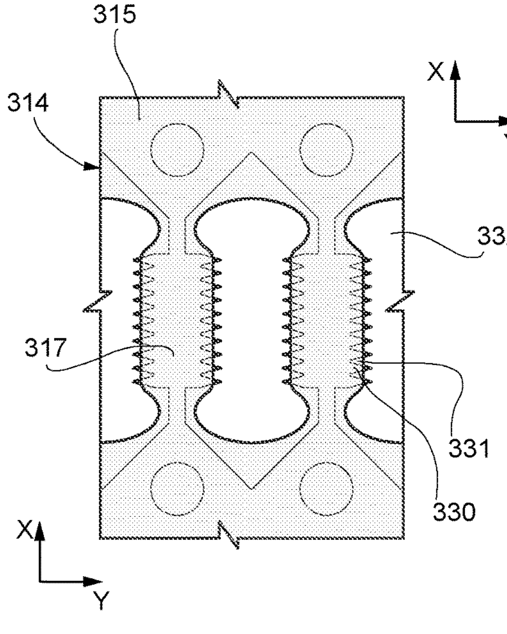

FIG. 10 shows another shape of the chambers (here indicated by 317) and of the openings (here indicated by 332) in the nozzle layer 315.

Here, the chambers 317 have a general rectangular shape, in top plan view (parallel to plane XY) with point-tipped protrusions 330 separated by similarly shaped indentations 331.

The openings 332 have a generally constant width (in a direction parallel to the second axis Y) with enlarged ends, with an aspect ratio of at least 3:1.

In general, in further embodiments, the shape of the chambers, of the openings, of the projections and of the indentations therebetween may widely vary, as long as the openings have micrometric intersection areas with the indentations.

The microfluidic device 100 of FIGS. 7-10 may be manufactured as discussed below with reference to FIGS. 11-28.

In these Figures, the manufacturing of a single microfluidic device 100 is described; in general however, many microfluidic devices are manufactured in a single wafer and separated at an intermediate or a final step, in a manner known in the art, even if not discussed in detail.

Figure 11:
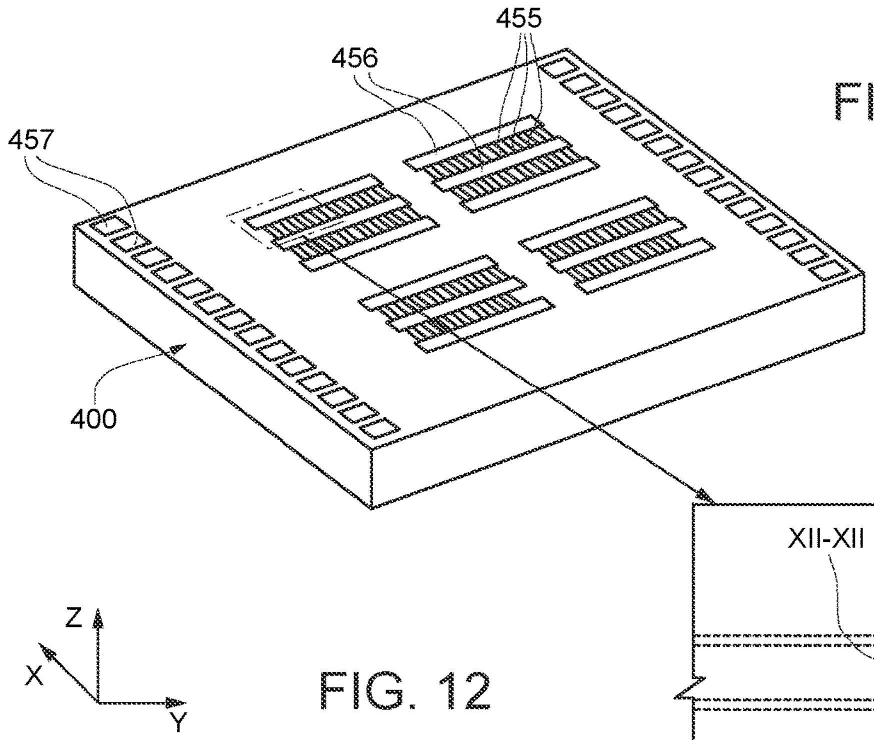
FIG. 11 shows a top perspective view of the present microfluidic device, in an intermediate manufacturing step.

FIG. 11 shows a portion of a wafer 400 that has already been worked to form the heaters and the electrical connection structures.

Figure 13:
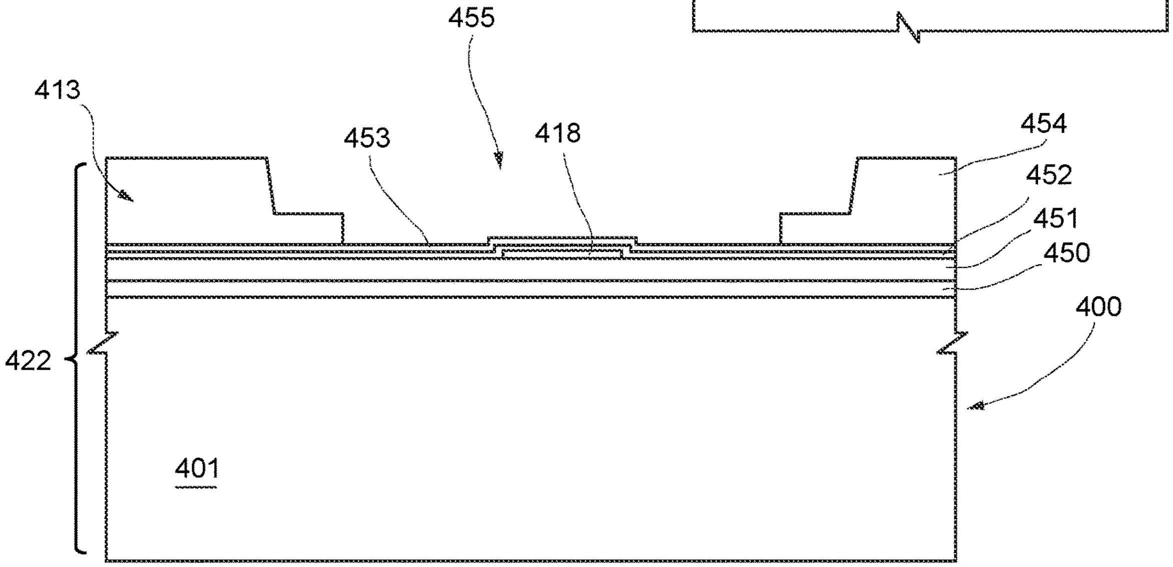
FIG. 13 is a cross-section of a portion of the microfluidic device of FIG. 11, taken along line XII-XII of FIG. 12.

In detail, FIG. 13, the wafer 400 comprises a substrate 401, for example of monocrystalline silicon, covered by an insulating layer 413 accommodating heaters 418. The substrate 401 and the insulating layer 413 form a base body portion 422.

Here, the insulating layer 413 is a multilayer including, e.g., an oxide layer 450, for example of thermal oxide; a first intermediate dielectric layer 451, for example BPSG (BoroPhosphoSilicate Glass); a second intermediate dielectric layer 452, for example silicon nitride; and a protection layer 454, for example USG (Undoped Silicon Glass).

A heater 418, for example of TaSiN or TaAlN, extend between the first and the second intermediate dielectric layers 451 and 452.

A metal layer 453, for example Tantalium, extends here on the second intermediate dielectric layer 452 and forms a heat distribution layer. In some applications, however, the metal layer 453 may be missing.

The protection layer 454 covers the metal layer 453 and accommodates electric connection lines 419 (FIG. 12), of conductive material, for example of Al, that are connected to the heaters 418 in openings (not visible) in the protection layer 454 and in the metal layer 453 and couple the heaters 418 to pads (not represented, for simplicity), arranged on the periphery of the microfluidic device.

The protection layer 454 is shaped to form chamber cavities 455 at locations where the chambers are to be formed. In particular, each chamber cavity 455 overlies a respective heater 418. The shape of the chamber cavities 455 may be the same as the desired shape of the chambers or any, for example rectangular; in general, the area of the each first chamber cavity 455 is smaller than the chamber area.

In addition, the protection layer 454 forms tank connection cavities 456 (FIG. 11), each extending near groups of first chamber cavities 455, as explained better later on, and pad cavities 457 (FIG. 11) overlying the pads (not shown).

Then, FIGS. 14-17, a lower chamber layer 460 is deposited and defined. The lower chamber layer 460 is for example of a photosensitive dry material that is spinned and defined to delimit lower chamber openings 461 vertically arranged over and in prosecution to the chamber cavities 455, but slightly larger, as visible in FIG. 17.

The lower chamber openings 461 are for example shaped as shown in FIG. 9 and visible in the enlarged detail of FIG. 16. In particular, the lower chamber openings 461 are delimited by a wall forming lower indentations 466 separated by lower protrusions 467 (FIG. 16).

In addition, the lower chamber layer 460 is shaped to form lower pillar portions 464 (FIGS. 15 and 16).

The lower chamber layer 460 is also removed to form lower tank connection openings 462 over the tank connection cavities 456 of FIG. 11 and to form lower pad opening 463 over the pad cavities 457, as shown in FIG. 14.

The lower chamber layer 460 is then baked and hardened.

In FIGS. 18-21, an upper chamber layer 470 is deposited and defined. The upper chamber layer 470 is for example of a photosensitive dry material, the same or different from the lower chamber layer 460. The upper chamber layer 470 is, e.g., spinned and defined to delimit upper chamber openings 471 vertically arranged over and in prosecution (e.g., fluidically connected) to the lower chamber openings 461. The lower and upper chamber layers 460, 470 form chamber layer 414.

Thereby, lateral walls 416 are formed (FIG. 20).

As visible in the top plan view of FIG. 19, the upper chamber openings 471 have a similar shape to the lower chamber openings 461, but are slightly larger. In particular, the upper chamber openings 471 have upper indentations 476 that extend deeper in the lateral walls 416 than the lower indentations 266 and upper protrusions 477 that are about aligned with the lower protrusions 467, as also visible by the dashed portions in FIG. 20.

In addition, the upper chamber layer 470 is shaped to form upper pillar portions 474 (FIG. 19), vertically aligned to the lower pillar portions 464.

As indicated in FIG. 20, the upper chamber openings 471 and the lower chamber openings 461 form chambers 417; the upper protrusions 477 and the lower protrusions 467 form chamber protrusions 430; the upper indentations 476 and the lower indentations 466 form chamber indentations 431; the upper pillar portions 474 and the lower pillar portions 464 form pillars 433 (FIG. 19).

As can be seen in particular in FIG. 19, the lower and upper chamber layers 460, 470 also form inlets 420.

The upper chamber layer 470 also form upper tank connection openings 472 over the lower tank connection openings 462 of FIG. 15 as well as upper pad openings 473 over the lower pad openings 463 of FIG. 14, as shown in FIG. 18.

The upper chamber layer 470 is then baked and hardened.

Figure 21:
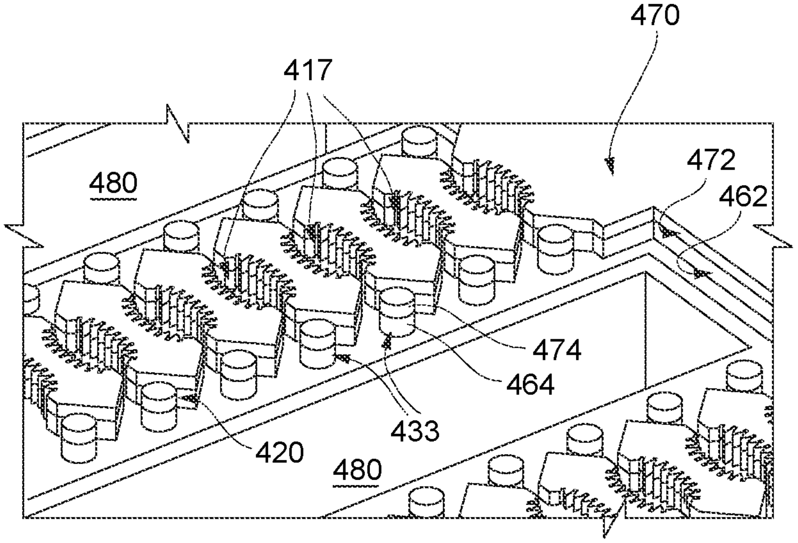
FIG. 21 is a top perspective view of a part of the microfluidic device of FIG. 18, in a subsequent manufacturing step and in an enlarged scale.
Figure 22:
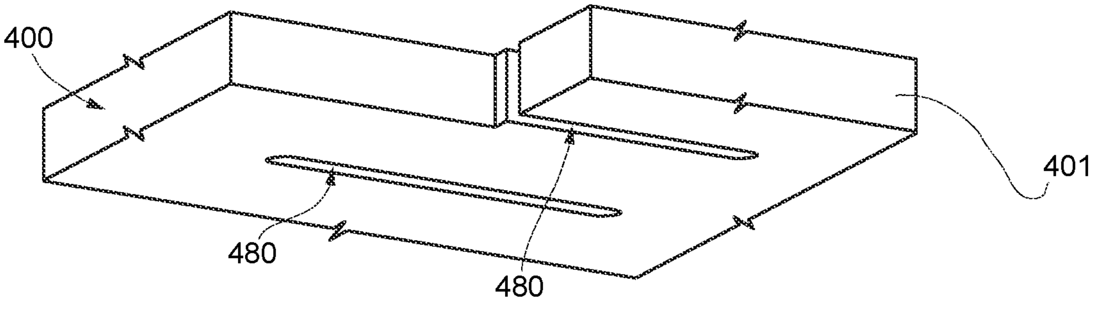
FIG. 22 is a bottom perspective view of the microfluidic device of FIG. 21, with a cut-away corner portion.
Figure 23:
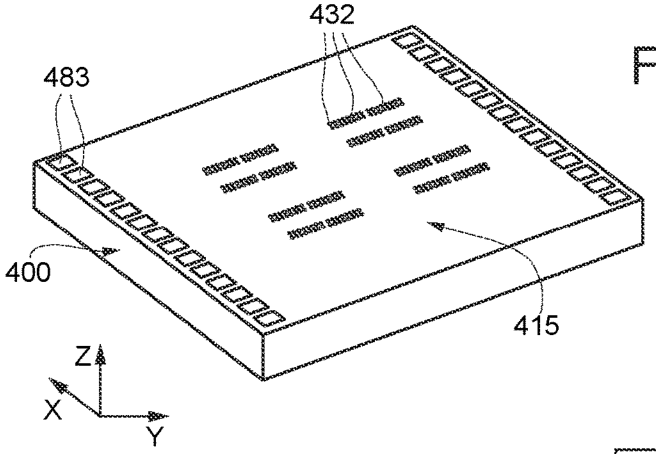
FIG. 23 is a top perspective view of the microfluidic device of FIG. 21, in a subsequent manufacturing step.

Then, FIGS. 21-22, the substrate 401 is dry etched to remove the semiconductor material of the substrate 401 under the tank connection openings 472, 462. Thereby, fluid supply channels 480 are formed. The fluid supply channels 480 extend through the entire thickness of substrate 401, laterally to the chambers 417, and in fluid connection with the inlets 420.

Figure 24:
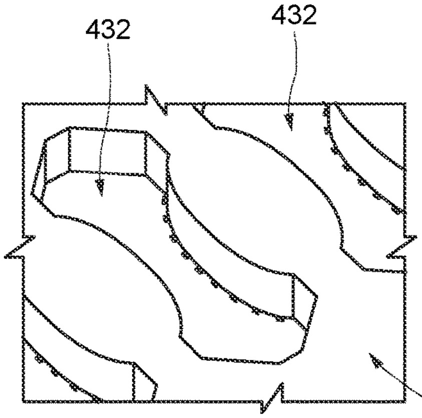
FIG. 24 shows a detail of the device of FIG. 23, in an enlarged scale.
Figure 25:
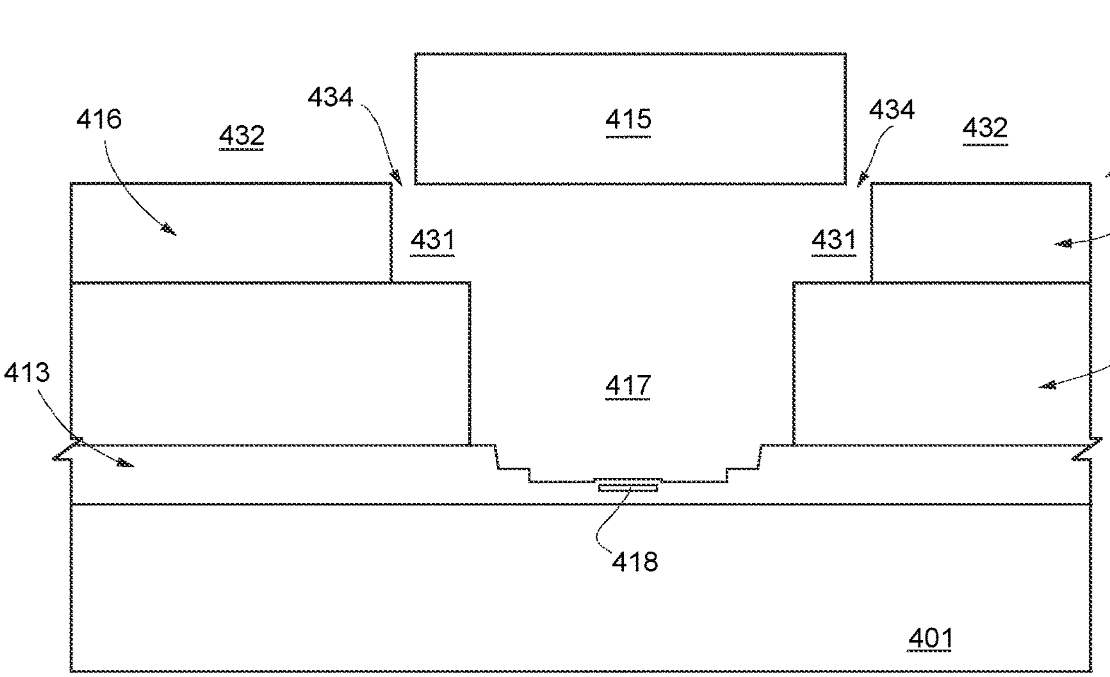
FIG. 25 is a cross-section of the same portion of FIG. 20, at the manufacturing step of FIG. 23.

In FIGS. 23-26, a nozzle layer 415 is deposited and defined. The nozzle layer 415 is, e.g., of a photosensitive dry film, that may be the same or different from the lower and upper chamber layers 460, 470. The nozzle layer 415 is laminated and defined according to standard photolithographic techniques to form openings 432, shaped as shown in FIGS. 9 and 24.

Figure 26:
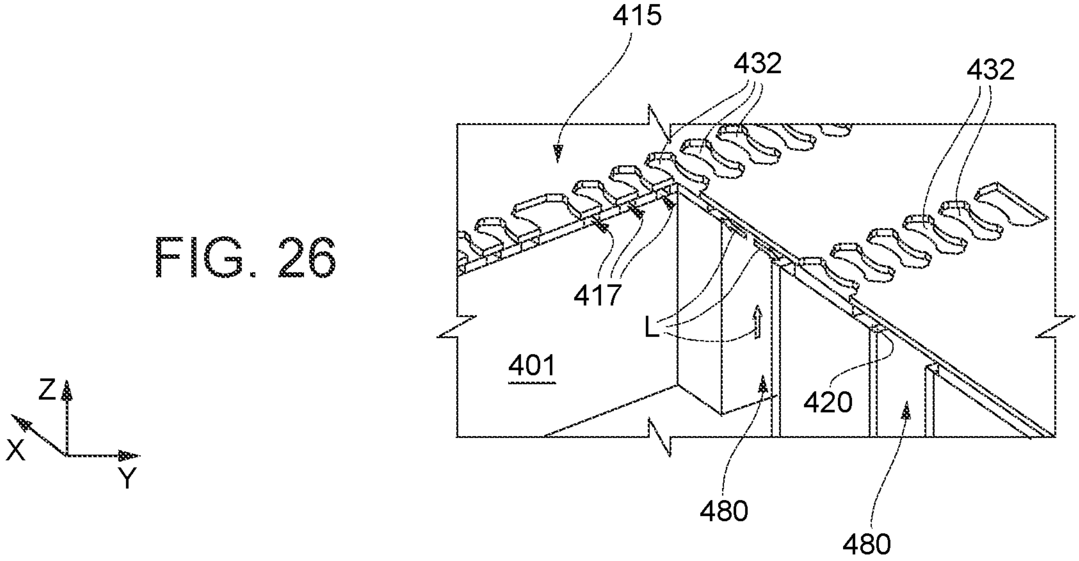
FIG. 26 is a perspective cross-section of a portion of the microfluidic device of FIG. 23, in an enlarged scale and with a cut-away portion.
Figure 27:
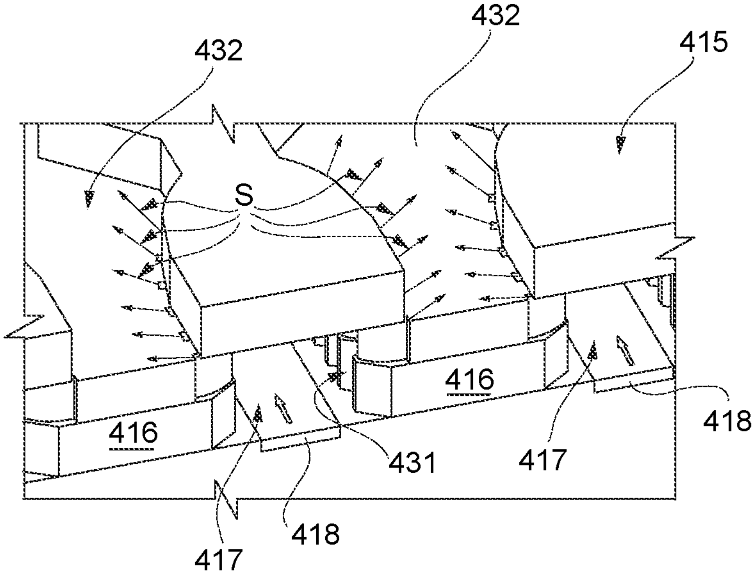
FIG. 27 shows a detail of the portion of FIG. 26, in a further enlarged scale and showing the flow of a sprayed fluid, in use.

The openings 432 are offset with respect to the chambers 417, as explained with reference to FIG. 9 and visible also in FIGS. 26-27, so that the nozzle layer 415 cover most of the area of the chambers 417 except for, at least, part of the chamber indentations 431, forming intersection areas 434 (FIG. 27).

Figure 12:
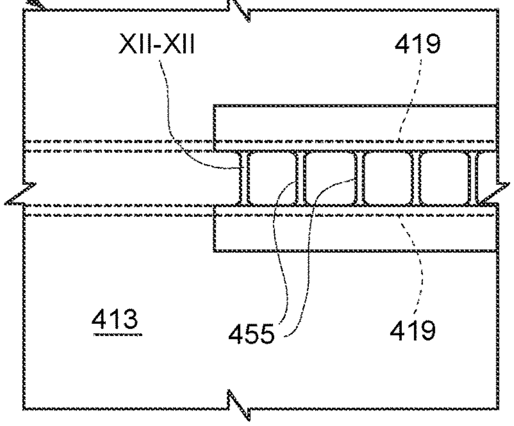
FIG. 12 is a top plan view of a portion of the device of FIG. 11.

The nozzle layer 415 also upwardly covers the inlets 420 and the fluid supply channels 480 and is removed over the lower and upper pad openings 463, 473 (pad openings 483, FIG. 23), to allow electrical connection to the electric connection lines 419 (FIG. 12).

Figure 28:
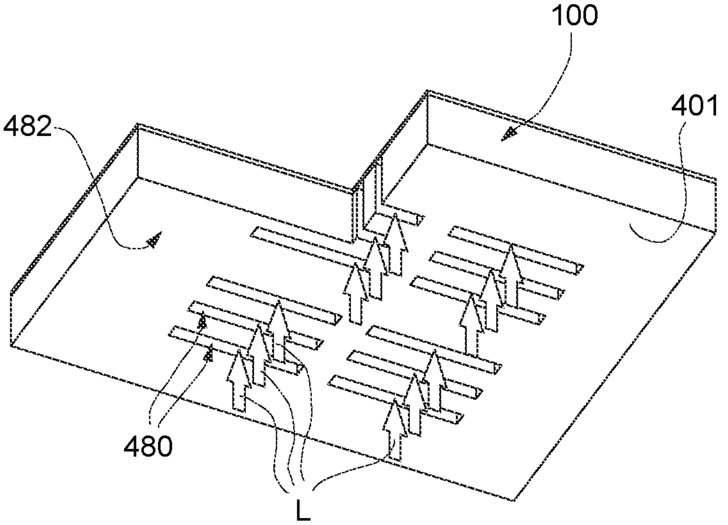
FIG. 28 is bottom perspective view of the device of FIG. 23, showing the inlet flow of the fluid to be sprayed, in use.

Therefore, as visible in FIGS. 26-28 and indicated by arrows L, fluid entering the fluid supply channels 480 from a lower face 482 of the substrate 401 may reach the inlets 420 and the chambers 417, be heated by the heaters 418, causing generation of bubbles, and be ejected through the intersection areas 434, analogously to the operation described in above cited patent application US 2018/0141074.

In particular, as shown by the arrows S in FIG. 27, by virtue of the small dimensions of the intersection areas 434, many small drops are ejected, ensuring a high total volume of the sprayed liquid with very small diameter drops.

Since the small features determining the dimension of the ejected drops are formed in the lower and upper chamber layers 460, 470, in particular in the upper chamber layer 470, which may be defined in a simple way, using standard, reliable and well known photolithographic techniques, manufacturing of the microfluidic device 100 is simple and reliable.

The obtained geometry is thus well controlled and the microfluidic device 100 is able to operate in a desired manner.

By forming the chambers 417 so as to have smaller areas at the lower chamber openings 461 than at the upper chamber openings 471, better ejection conditions may be obtained; in addition, the resulting chamber 417 is more easily complying the volume ratio of 15% discussed above, all the other geometrical aspects being equal.

According to a different embodiment, the nozzle layer 15 of FIG. 3 is formed by a separate wafer, that is bonded to the wafer accommodating the chambers 17, as discussed below with reference to FIGS. 29-40.

Figure 29:
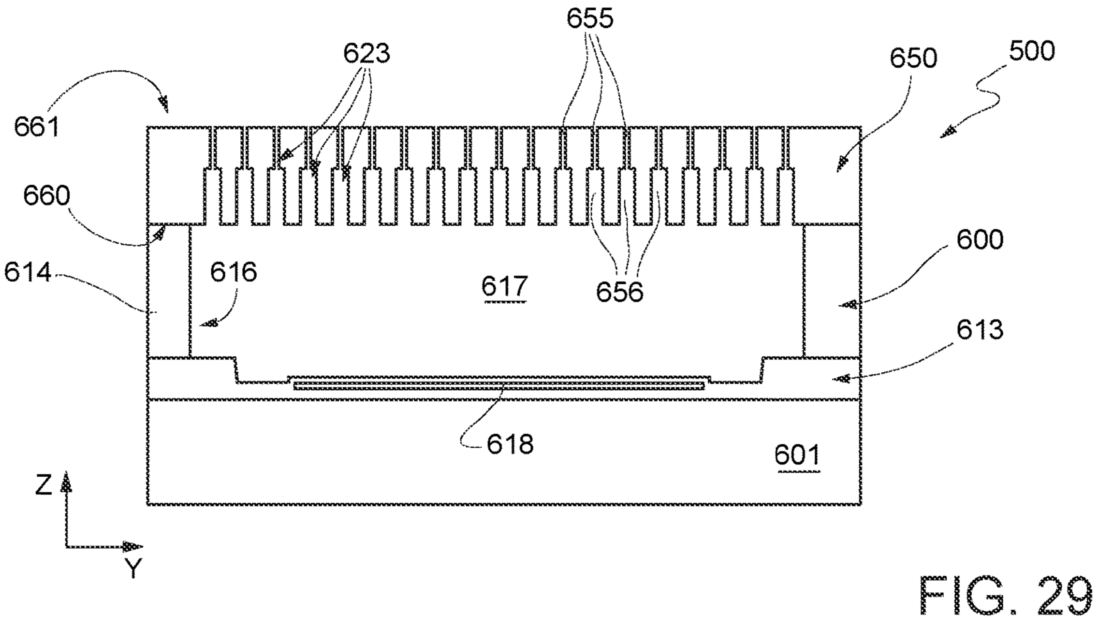
FIG. 29 is a cross-section of another embodiment of the present microfluidic device.

With reference to FIG. 29, a microfluidic device 500 comprises a lower wafer 600 and an upper wafer 650.

The lower wafer 600 basically comprise the same structures as wafer 400 of FIGS. 21-22. Accordingly, the same elements are identified by reference numbers increased by 200 with respect to the correspondent elements in FIGS. 21-22 and are not described in detail again.

In particular, the chamber layer, here identified by number 614, may be formed by a single layer, e.g., of a polymeric material, as shown, or by a multiple layer, analogously to lower and upper chamber layers 460, 470 of FIG. 20. The chamber layer 614 forms chamber 617 delimited by a lateral wall 616.

Upper wafer 650 is a semiconductor wafer shaped to form a plurality of nozzle openings 623, extending for the entire thickness of the upper wafer 650.

In particular, here, each nozzle opening 623 comprises a smaller section portion 655 and a larger section portion 656.

Specifically, the upper wafer 650 has a lower main surface 660, facing the lower wafer 600, and an upper main surface 661, opposite the lower main surface 660. The smaller section portions 655 of the nozzle openings 623 extend from the upper main surface 661; the larger section portions 656 extend from the lower main surface 660 and directly face the lower wafer 600.

The smaller section portions 655 of the nozzle openings 623 may have a circular cross-section, with a diameter of about 2 μm; the larger section portions 656 may also have a circular cross-section, with a diameter of about 3 μm, and be concentric to the smaller section portions 655.

The microfluidic device 500 of FIG. 29 is manufactured as described below, with reference to FIGS. 30-40.

Figure 30:
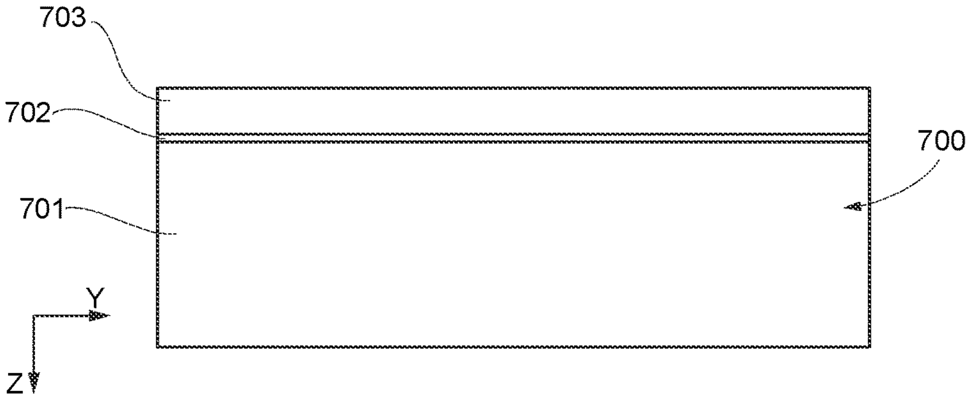
FIGS. 30-31 are cross-sections of a wafer of semiconductor material in subsequent manufacturing steps of the microfluidic device of FIG. 29.

Initially, FIG. 30, a starting substrate 700 is used. Starting substrate 700 comprises a first semiconductor layer 701, an intermediate layer 702 of insulating material, and a second semiconductor layer 703. For example, first semiconductor layer 701 may be silicon with a thickness of about 400 μm, intermediate layer 702 may be silicon oxide with a thickness of about 1 μm, and second semiconductor layer 703 may be silicon with a thickness of about 5-10 μm.

Figure 31:
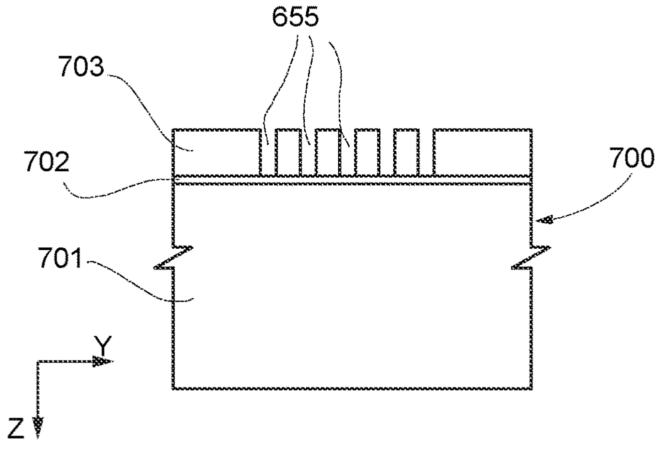

In FIG. 31, the second semiconductor layer 703 is etched using known photolithographic techniques to form the smaller section portions 655 of the nozzle openings 623.

Figure 32:
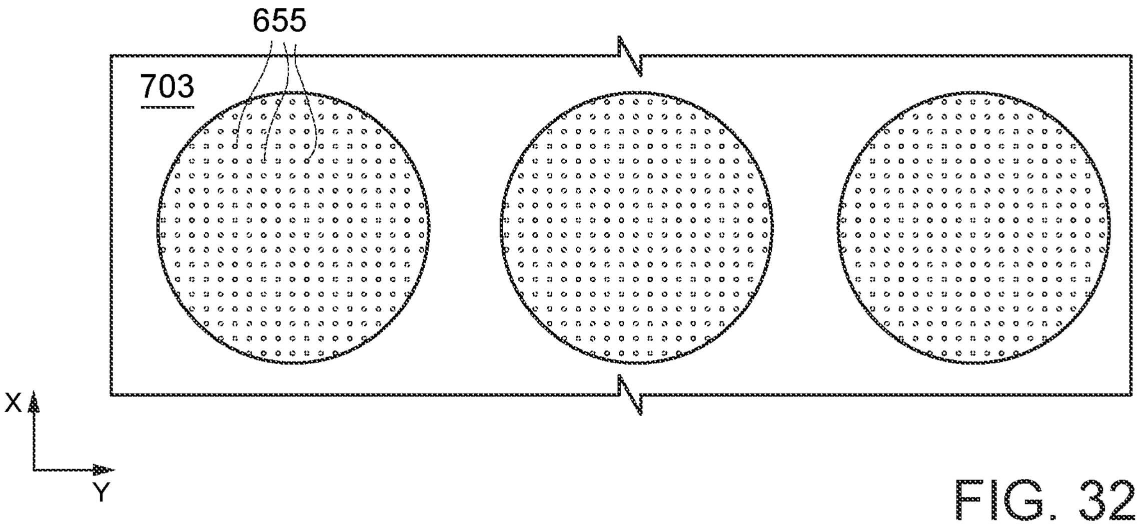
FIG. 32 is a bottom plan view of the wafer of FIG. 31.

The smaller section portions 655 of the nozzle openings 623 may have the shapes shown in FIGS. 7-10. In the alternative, they may be arranged according the so-called showerhead arrangement, as shown in FIG. 32, or in any other arrangement.

Figure 33:
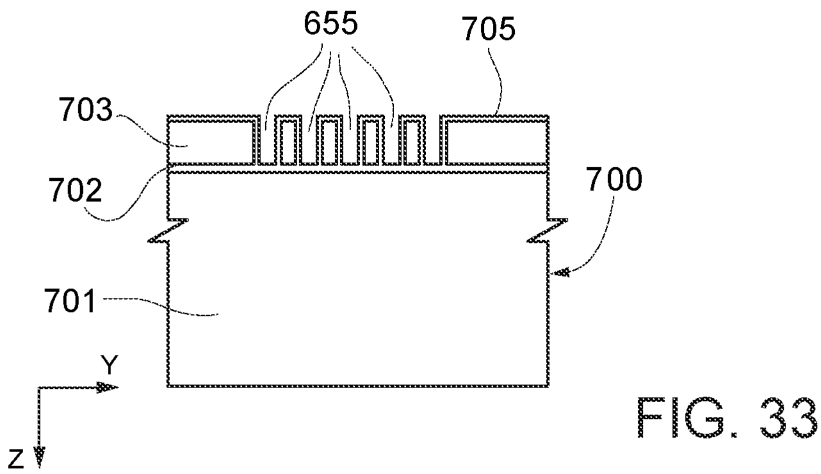
FIGS. 33-34 are cross-sections analogous to FIGS. 30-31, in subsequent manufacturing steps.

Then, FIG. 33, thermal oxidation is performed; thus an etch stop layer 705 covers the surface of the second semiconductor layer 703, including inside the smaller section portions 655 of the nozzle openings 623. The etch stop layer 705 may be, e.g., 0.4 μm thick.

Figure 34:
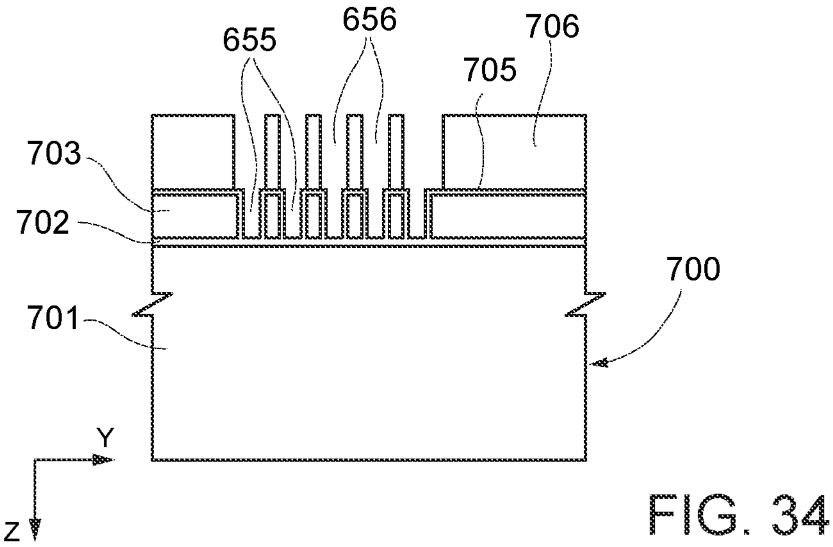

In FIG. 34, a structural layer 706 of silicon is epitaxially grown on the etch stop layer 705 and then planarized, e.g., by CMP (Chemical Mechanical Polishing). The structural layer 706 grows on the thin covering layer 705 and may extend in the smaller section portions 655 of the nozzle openings 623. The final thickness of the structural layer 706 may be 10 μm.

Then, the structural layer 706 is etched using a mask to form the larger portion sections 656 of the nozzle openings 623.

Since the larger portion sections 656 are vertically centered with the smaller section portions 655 of the nozzle openings 623, etching stops on the etch stop layer 705 and removes the silicon within the smaller section portions 655.

Figure 35:
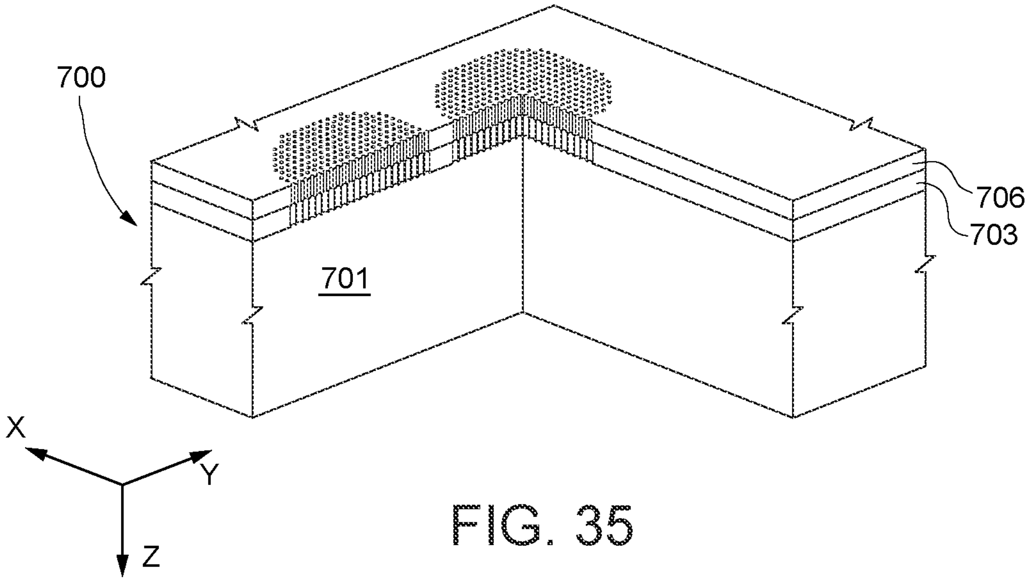
FIG. 35 shows a perspective, partially cut view of a portion of the wafer of FIG. 34.

FIG. 35 shows the resulting starting substrate 700 in a partially cut-away perspective view where intermediate layer 702 and etch stop layer 705 are not visible.

Figure 36:
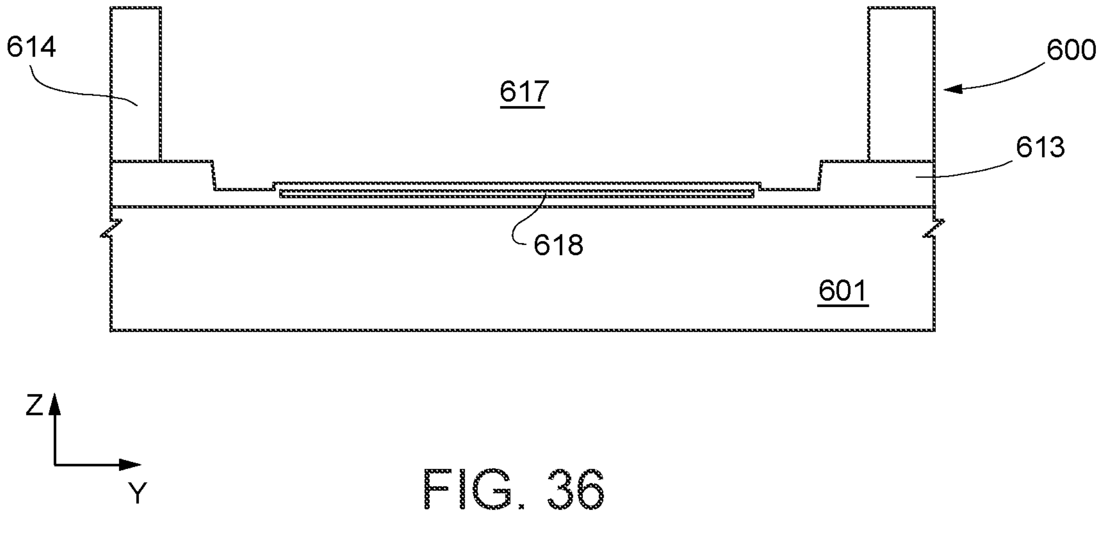
FIG. 36 is a cross-section of a portion of another wafer of semiconductor material for forming the microfluidic device according to the embodiment of FIG. 29.

Simultaneously, before or after working the starting wafer 700, the first wafer 600 is worked to obtain the structure of FIG. 36. In a not visible manner, also fluid supply channels (680 in FIG. 40) have already been formed.

Figure 37:
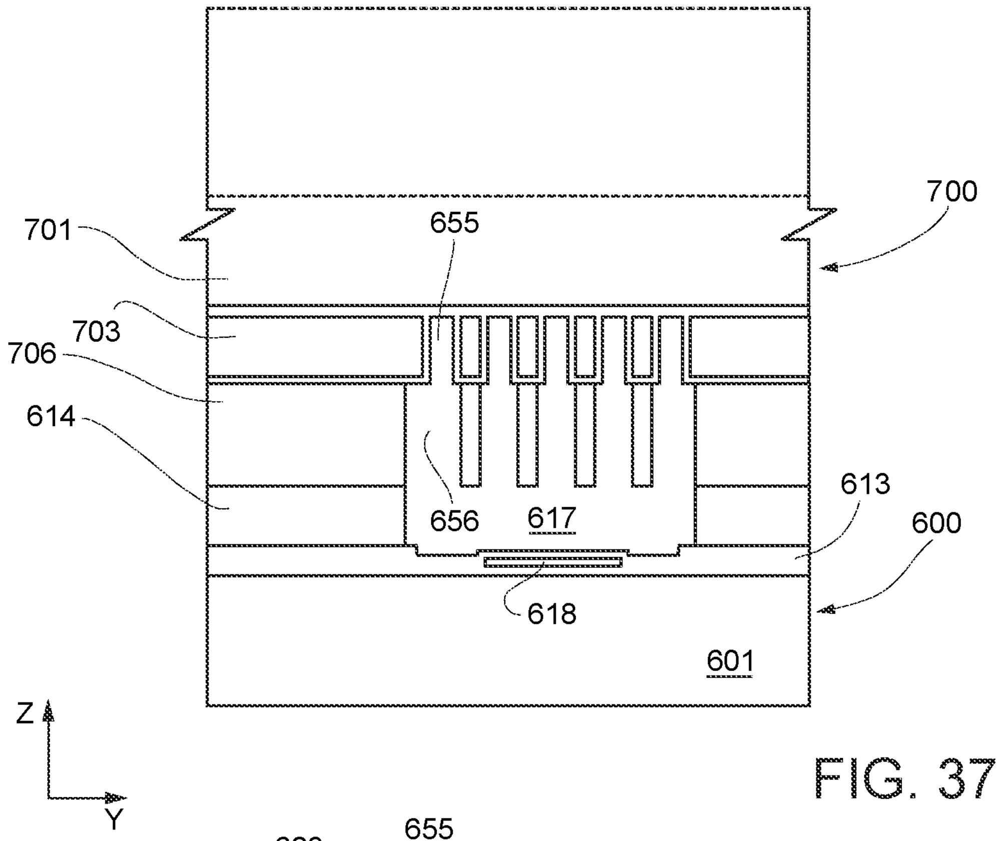
FIGS. 37-38 are cross-sections of a portion of a combined wafer obtained from the wafers of FIGS. 34 and 36, in subsequent manufacturing steps.

Then, FIG. 37, the starting wafer 700 is turned upside down and bonded to the lower wafer 600. Here, the chamber layer 614 acts as an adhesion layer that is directly bonded to the structural layer 706, with the first semiconductor layer 701 arranged at the top.

Thereafter, the starting wafer 700 is thinned, e.g., by grinding the first semiconductor layer 701, as shown by the dashed lines. For example, the first semiconductor layer 701 may be reduced to a thickness of about 40 μm.

Figure 38:
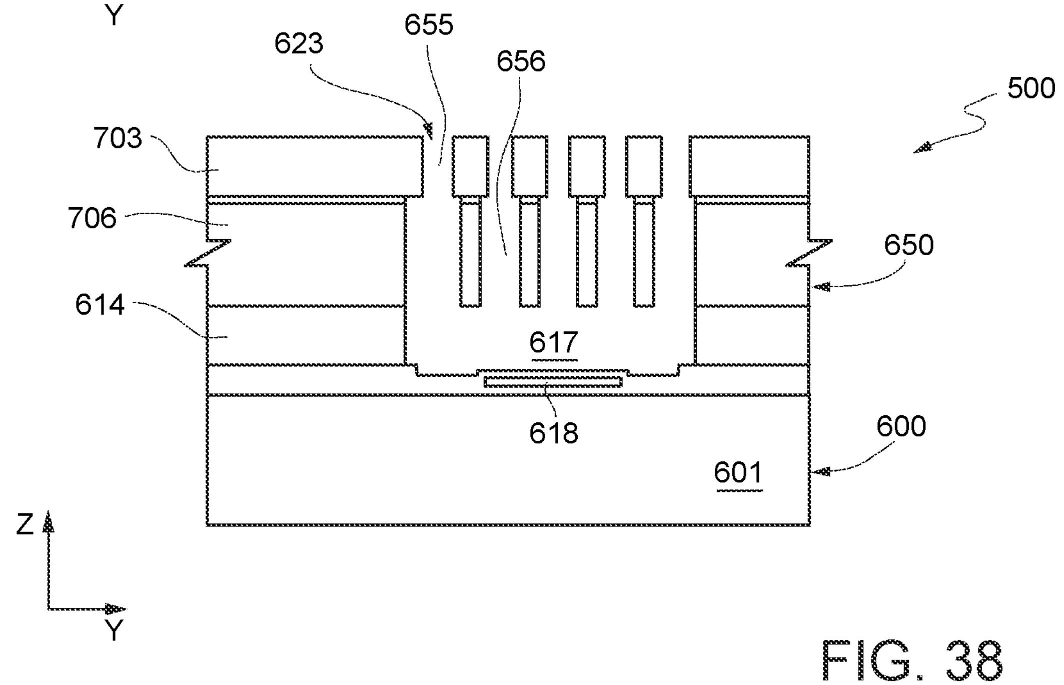

In FIG. 38, the first semiconductor layer 701 is completely removed, for example by dry etch; in addition, also the exposed portions of the intermediate layer 702 and of the etch stop layer 705 are removed by dry etch. The upper wafer 650 is thus obtained.

Thereby, the microfluidic device 500 of FIGS. 29 and 38 is obtained.

Figure 39:
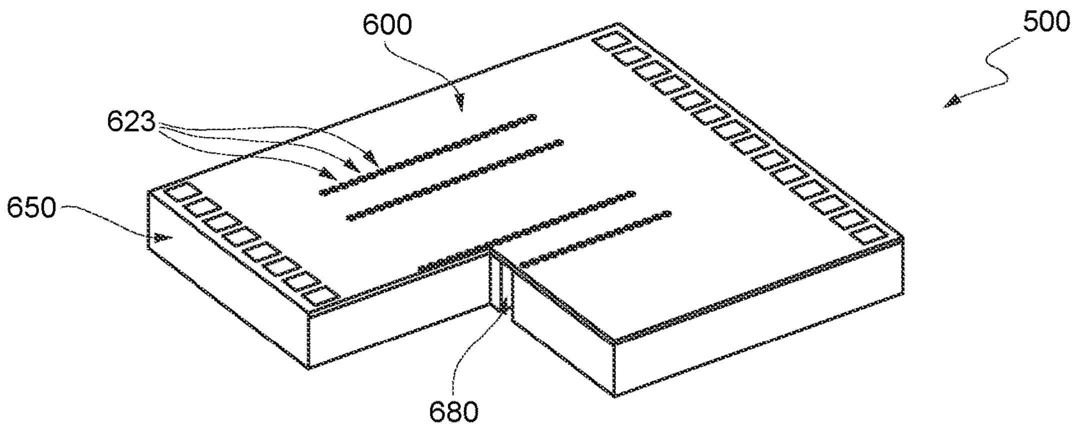
FIG. 39 is a top perspective view of the combined wafer of FIGS. 37-38, with a cut-away portion.
Figure 40:
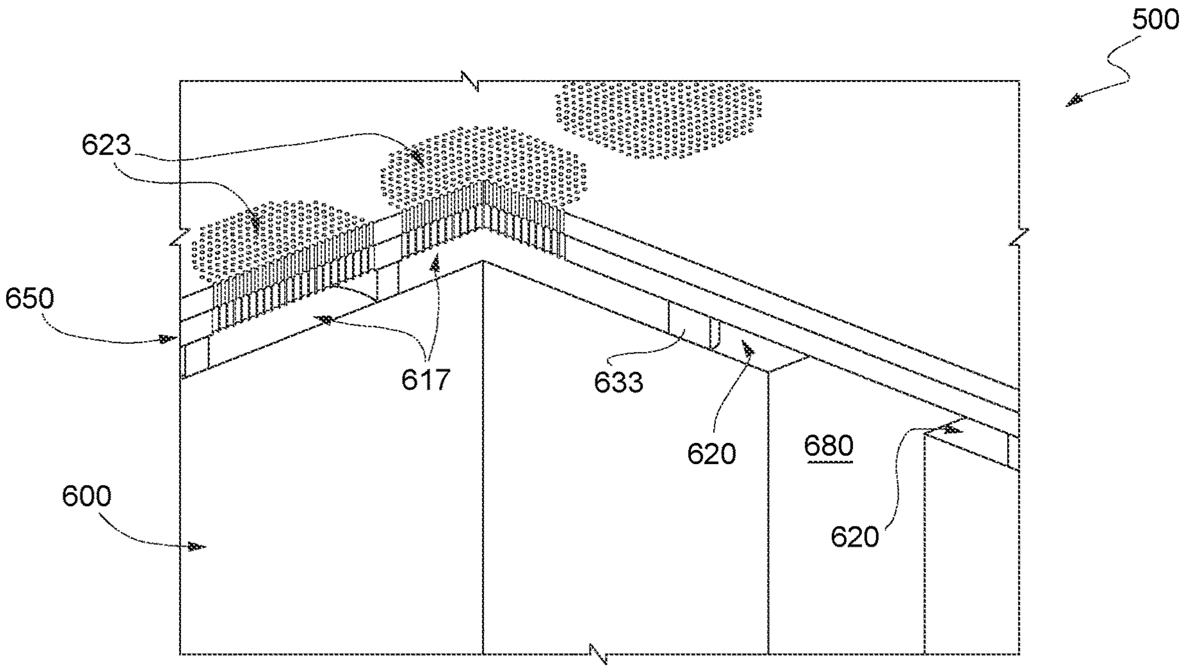
FIG. 40 shows a detail of combined wafer of FIG. 39 in an enlarged, top perspective view.

FIGS. 39 and 40 show prospective views of the microfluidic device 500, showing the relative position of the chambers 617 and the nozzle apertures 623, as well as of fluid supply channels 680, inlets 420 and pillars 633.

With the process of FIGS. 29-40, small features may be easily defined. In particular, in case of nozzle openings 623 forming a showerhead pattern, with a plurality of nozzle openings 623 for each chamber 617, small dimensions may be obtained by dry etching the starting wafer 700, in an easily definable way.

The same steps may however be used to form large dimension nozzle openings 623, with small features formed in the chamber layer 614 as an alternative to the deposition of a photosensitive dry film, as discussed with reference to FIGS. 11-28.

Finally, it is clear that numerous variations and modifications may be made to the microfluidic device and the manufacturing steps described and illustrated herein, all falling within the scope of the disclosure.

For example, the various embodiments described above can be combined to provide further embodiments.

In particular, the heaters 18, 418, 618 may be replaced by actuators operating according to a different principle; for example actuators of a piezoelectric material, for example PZT (Pb, Zr, $TiO_3$) may be used, e.g., as disclosed in US2019/0358955.

The shape of the chambers 17, 417 and 617 may widely vary, so as the shape of the protrusions 130, 230, 430 and indentations 131, 231, 431.

A microfluidic device (1; 100; 500) may be summarized as including a chamber (17; 117; 217; 317; 417; 617); a fluidic access channel (20; 120; 420, 480; 620, 680) in fluidic connection with the chamber; a plurality of nozzle apertures (34; 134; 434; 623) in fluidic connection with the chamber; and an actuator (18; 418; 618), operatively coupled to the fluid containment chamber and configured to cause ejection of drops of fluid through the nozzle apertures in an operating condition of the microfluidic device, wherein the chamber (17; 117; 217; 317; 417; 617) has an elongated shape, with a length and a maximum width, wherein an aspect ratio between the length and the maximum width of the chamber is at least 3:1.

The chamber (17; 117; 217; 317; 417; 617) may have a rectangular or oval base shape.

The chamber (17; 117; 217; 317; 417; 617) may be delimited by a first base (17A), a second base (17B) and a lateral wall (16; 116; 216; 416), the first and second bases extending along a first and a second direction, the second direction transverse to the first direction, the first and second directions defining the chamber length and the chamber maximum width, respectively, the lateral wall extending along a third direction, transverse to the first and second directions and defining a chamber height.

The chamber (17; 117; 217; 317; 417; 617) may have a chamber volume and the nozzle apertures (34; 134; 434; 623) may be configured to generate, in use, a plurality of drops having a total drop volume, wherein a ratio total drop volume to chamber volume is at least 15%.

The microfluidic device may include a base body portion (22; 422), a chamber layer (14; 114; 414; 614) and a nozzle layer (15; 115; 215; 315; 415; 650), the base body portion forming the first base (17A) and accommodating the actuator (18; 418; 618), the chamber layer forming the lateral wall (16; 116; 216; 416; 616) and the nozzle layer forming the second base (17B) of the chamber (17; 117; 217; 317; 417; 617).

The lateral wall (16; 116; 216; 416) may form a plurality of indentations (131; 231; 331; 431) and protrusions (130; 230; 330; 430), and the nozzle layer (15; 115; 215; 315; 415) may include at least one nozzle opening (132; 232; 332; 432) offset with respect to the chamber (17; 117; 217; 317; 417) and intersecting the indentations at intersection areas forming the nozzle apertures (34; 134; 434).

The chamber layer (414) may include a first layer (460) extending on the base body (422) portion and a second layer (470), extending on the first layer, the first layer delimiting a lower chamber aperture (461), the second layer delimiting an upper chamber aperture (471), the lower chamber aperture having a smaller area than the upper chamber aperture.

The chamber layer (14; 114; 214; 314; 414) and the nozzle layer (15; 115; 215; 315; 415) may be polymeric layers.

The nozzle layer (650) may be silicon wafer.

Each nozzle aperture (623) may include a larger section portion (656) facing the chamber (617) and a smaller section portion (655) in prosecution of the larger section portion and extending from an outer surface (661) of the nozzle plate (650).

The nozzle apertures (623) may be arranged in a showerhead arrangement above the chamber (617).

A process for manufacturing a microfluidic device may be summarized as including forming a chamber (17; 117; 217; 317; 417; 617); forming a fluidic access channel (20; 120; 420, 480; 620, 680) in fluidic connection with the chamber; forming a plurality of nozzle apertures (34; 134; 434; 623) in fluidic connection with the chamber; and forming an actuator (18; 418; 618), operatively coupled to the fluid containment chamber and configured to cause ejection of drops of fluid through the nozzle apertures in an operating condition of the microfluidic device, wherein the chamber (17; 117; 217; 317; 417; 617) has an elongated shape, with a length and a maximum width, wherein an aspect ratio between the length and the maximum width of the chamber is at least 3:1.

Forming an actuator (18; 418; 618) may include forming the actuator in a base body portion (22; 422); forming a chamber (17; 117; 217; 317; 417; 617) may include forming a chamber layer (14; 114; 414; 614) on the base body portion, with the chamber overlying the actuator, the base body portion forming a first base (17A) of the chamber and the chamber layer forming a lateral wall of the chamber; and forming a plurality of nozzle apertures (34; 134; 434; 623) may include forming a nozzle layer (15; 115; 215; 315; 415; 650) on the chamber layer and forming at least one opening that at least partially overlies the chamber, the nozzle layer covering the chamber and forming a second base (17B) of the chamber.

Forming a chamber layer (114; 214; 314; 414) may include shaping the lateral wall (116; 216; 316; 416) to form a plurality of indentations (131; 231; 331; 431) and protrusions (130; 230; 330; 430), and forming at least one opening comprises forming a nozzle opening (132; 232; 332; 432) offset with respect to the chamber and intersecting the indentations at intersection areas, thereby forming the nozzle apertures (34; 134; 434).

Forming a chamber layer (414, 614) may include forming a first layer (460) on the base body portion (422), the first layer defining a first chamber aperture (461); forming a second layer (470) on the first layer, the second layer defining a second chamber aperture (471), the first chamber aperture having a smaller area than the second chamber aperture.

The chamber layers (14; 114; 214; 314; 414) and the nozzle layer (15; 115; 215; 315; 415) may be polymeric layers.

Forming a nozzle layer may include forming first opening portions (655) in a semiconductor wafer (700); forming second opening portions (656) in the semiconductor wafer over the first opening portions, the second opening portions having larger area than the first opening portions and extending in prosecution to the first opening portions; bonding the semiconductor wafer (700) to the chamber layer (614), with the second opening portions facing the chamber; and thinning the semiconductor wafer to expose the first opening portions.

The first opening portions (655) extend for a partial thickness of a starting wafer (700) of semiconductor material; after forming first opening portions, an etch stop layer (702) may be grown on the starting wafer, a semiconductor layer (706) may be grown on the etch stop layer, thereby forming the semiconductor wafer (700), and the second opening portions are formed in the semiconductor layer; and thinning the semiconductor wafer may include removing the starting wafer up to the first opening portions.

A microfluidic MEMS device (1; 100; 500) may also be summarized as including:

- a plurality of chambers (17; 117; 217; 317; 417; 617), the chambers (17; 117; 217; 317; 417; 617) having an elongated shape, with a length and a maximum width, wherein an aspect ratio between the length and the maximum width of the chambers is at least 3:1;
- a fluidic access channel (20; 120; 420, 480; 620, 680) for each chamber, in fluidic connection with a respective chamber;
- a plurality of nozzle apertures (34; 134; 434; 623) for each chamber, in fluidic connection with the respective chamber;
- an actuator (18; 418; 618) for each chamber, operatively coupled to the respective chamber and configured to cause ejection of drops of fluid through the nozzle apertures in an operating condition of the microfluidic MEMS device;
- a chamber layer (14; 114; 414; 614) and a nozzle layer (15; 115; 215; 315; 415; 650), overlying each other, the chamber layer forming the plurality of chambers and the nozzle layer forming a plurality of nozzle openings (132; 232; 332; 432),
- each chamber being delimited by a lateral wall (16; 116; 216; 416) having a plurality of indentations (131; 231; 331; 431) and protrusions (130; 230; 330; 430); and the nozzle openings (132; 232; 332; 432) being offset with respect to the chambers (17; 117; 217; 317; 417), with each nozzle opening extending between two adjacent chambers and intersecting the indentations of the two adjacent chambers at intersection areas forming the nozzle apertures (34; 134; 434).

The chamber (17; 117; 217; 317; 417; 617) may have a rectangular or oval base shape.

The chamber (17; 117; 217; 317; 417; 617) may be delimited by a first base (17A), a second base (17B) and the lateral wall (16; 116; 216; 416), the first and second bases extending along a first and a second direction, the second direction transverse to the first direction, the first and second directions defining the chamber length and the chamber maximum width, respectively, the lateral wall extending along a third direction, transverse to the first and second directions and defining a chamber height.

The chamber (17; 117; 217; 317; 417; 617) may have a chamber volume and the nozzle apertures (34; 134; 434; 623) may be configured to generate, in use, a plurality of drops having a total drop volume, and a ratio total drop volume to chamber volume is at least 15%.

The microfluidic device may further include a base body portion (22; 422) the base body portion forming the first base (17A) and accommodating the actuator (18; 418; 618), and the nozzle layer forming the second base (17B) of the chamber (17; 117; 217; 317; 417; 617).

The chamber layer (414) may include a first layer (460) and a second layer (470), extending on the first layer, the first layer delimiting a lower chamber aperture (461), the second layer delimiting an upper chamber aperture (471), the lower chamber aperture having a smaller area than the upper chamber aperture.

The first layer (460) may extend on the base body portion (422).

The chamber layer (14; 114; 214; 314; 414) and the nozzle layer (15; 115; 215; 315; 415) may be polymeric layers or the chamber layer (14; 114; 214; 314; 414) may be a polymeric layer and the nozzle layer (650) may be a silicon wafer.

The actuator may be a heater (18; 418; 618).

The nozzle openings (232; 332; 432) may have a larger area than the chambers (217; 317; 417).

A process for manufacturing a microfluidic MEMS device may be summarized as including:

- forming a plurality of chambers (17; 117; 217; 317; 417; 617), the chambers (17; 117; 217; 317; 417; 617) having an elongated shape, with a length and a maximum width, wherein an aspect ratio between the length and the maximum width of the chambers is at least 3:1;
- forming a fluidic access channel (20; 120; 420, 480; 620, 680) for each chamber, in fluidic connection with a respective chamber;
- forming a plurality of nozzle apertures (34; 134; 434; 623) for each chamber, in fluidic connection with the respective chamber; and
- forming an actuator (18; 418; 618) for each chamber, operatively coupled to the respective chamber and configured to cause ejection of drops of fluid through the nozzle apertures in an operating condition of the microfluidic MEMS device,
- wherein forming a plurality of chambers comprises forming a chamber layer (14; 114; 414; 614) and forming a lateral wall (16; 116; 216; 416) for each chamber, the lateral walls delimiting each a respective chamber and having a plurality of indentations (131; 231; 331; 431) and protrusions (130; 230; 330; 430),
- forming a plurality of nozzle apertures comprises forming a nozzle layer (15; 115; 215; 315; 415; 650) on the chamber layer and forming a plurality of the nozzle openings (132; 232; 332; 432) in the nozzle layer, and
- the nozzle openings (132; 232; 332; 432) being offset with respect to the chambers (17; 117; 217; 317; 417), with each nozzle opening extending between two adjacent chambers and intersecting the indentations of the two adjacent chambers at intersection areas forming the nozzle apertures (34; 134; 434).

Forming an actuator (18; 418; 618) may include forming the actuator in a base body portion (22; 422); and the chamber layer (14; 114; 414; 614) may be formed on the base body portion, with the chamber overlying the actuator, the base body portion forming a first base (17A) of the chamber and the nozzle layer covering the chamber and forming a second base (17B) of the chamber.

Forming a chamber layer (414, 614) may include:

forming a first layer (460) on the base body portion (422), the first layer defining a first chamber aperture (461);

forming a second layer (470) on the first layer, the second layer defining a second chamber aperture (471), the first chamber aperture having a smaller area than the second chamber aperture.

The chamber layers (14; 114; 214; 314; 414) and the nozzle layer (15; 115; 215; 315; 415) may be polymeric layers.

The nozzle openings (132; 232; 332; 432) may have a larger area than the chambers.

A microfluidic MEMS device (1; 100; 500) may also be summarized as including:

a chamber (17; 117; 217; 317; 417; 617);

a fluidic access channel (20; 120; 420, 480; 620, 680) in fluidic connection with the chamber;

a plurality of nozzle apertures (34; 134; 434; 623) in fluidic connection with the chamber; and an actuator (18; 418; 618), operatively coupled to the fluid containment chamber and configured to cause ejection of drops of fluid through the nozzle apertures in an operating condition of the microfluidic device, the chamber (17; 117; 217; 317; 417; 617) having an elongated shape, with a length and a maximum width, the length being greater than the width, a chamber layer (14; 114; 414; 614);

a nozzle layer (15; 115; 215; 315; 415; 650), overlying the chamber layer, wherein the chamber layer forms a lateral wall (16; 116; 216; 416) of the chamber and the nozzle layer forms at least one a nozzle opening (132; 232; 332; 432);

the lateral wall (16; 116; 216; 416) forming a plurality of indentations (131; 231; 331; 431) and a plurality of protrusions (130; 230; 330; 430), the nozzle opening (132; 232; 332; 432) being offset with respect to the chamber (17; 117; 217; 317; 417) and intersecting the indentations at intersection areas forming the nozzle apertures (34; 134; 434);

the chamber layer (414) comprises a first layer (460) and a second layer (470), extending on the first layer, the first layer delimiting a lower chamber aperture (461), the second layer delimiting an upper chamber aperture (471), the lower chamber aperture having a smaller area than the upper chamber aperture.

Another microfluidic MEMS device (1; 100; 500) may be summarized as including:

a chamber (17; 117; 217; 317; 417; 617);

a fluidic access channel (20; 120; 420, 480; 620, 680) in fluidic connection with the chamber;

a plurality of nozzle apertures (34; 134; 434; 623) in fluidic connection with the chamber; and an actuator (18; 418; 618), operatively coupled to the fluid containment chamber and configured to cause ejection of drops of fluid through the nozzle apertures in an operating condition of the microfluidic device, the chamber (17; 117; 217; 317; 417; 617) having an elongated shape, with a length and a maximum width, the length being greater than the width, a chamber layer (14; 114; 414; 614);

a nozzle layer (15; 115; 215; 315; 415; 650), overlying the chamber layer, wherein the chamber layer forms a lateral wall (16; 116; 216; 416) of the chamber and the nozzle layer forms at least one a nozzle opening (132; 232; 332; 432);

the lateral wall (16; 116; 216; 416) forming a plurality of indentations (131; 231; 331; 431) and a plurality of protrusions (130; 230; 330; 430), the nozzle opening (132; 232; 332; 432) being offset with respect to the chamber (17; 117; 217; 317; 417) and intersecting the indentations at intersection areas forming the nozzle apertures (34; 134; 434);

wherein each nozzle aperture (623) may comprise a larger section portion (656) facing the chamber (617) and a smaller section portion (655) in prosecution of the larger section portion and extending from an outer surface (661) of the nozzle plate (650).

The nozzle apertures (623) may be arranged in a showerhead arrangement above the chamber (617).

A process for manufacturing a microfluidic MEMS device may be summarized as including:

forming a chamber (17; 117; 217; 317; 417; 617) having an elongated shape, with a length and a maximum width, the length being greater than the width, forming a fluidic access channel (20; 120; 420, 480; 620, 680) in fluidic connection with the chamber;

forming a plurality of nozzle apertures (34; 134; 434; 623) in fluidic connection with the chamber; and forming an actuator (18; 418; 618), operatively coupled to the fluid containment chamber and configured to cause ejection of drops of fluid through the nozzle apertures in an operating condition of the microfluidic device, wherein:

forming a chamber (17; 117; 217; 317; 417; 617) comprises forming a chamber layer (14; 114; 414; 614) and forming a lateral wall (16; 116; 216; 416) in the chamber layer, the lateral wall having a plurality of indentations (131; 231; 331; 431) and protrusions (130; 230; 330; 430);

forming a plurality of nozzle apertures (34; 134; 434; 623) comprises forming at least one nozzle opening (132; 232; 332; 432) offset with respect to the chamber and intersecting the indentations at intersection areas, thereby forming the nozzle apertures (34; 134; 434), and forming a chamber layer (414, 614) comprises forming a first layer (460) on the base body portion (422), the first layer defining a first chamber aperture (461), and forming a second layer (470) on the first layer, the second layer defining a second chamber aperture (471), the first chamber aperture having a smaller area than the second chamber aperture.

Another process for manufacturing a microfluidic MEMS device may be summarized as including:

forming a chamber (17; 117; 217; 317; 417; 617) having an elongated shape, with a length and a maximum width, the length being greater than the width, forming a fluidic access channel (20; 120; 420, 480; 620, 680) in fluidic connection with the chamber;

forming a plurality of nozzle apertures (34; 134; 434; 623) in fluidic connection with the chamber; and forming an actuator (18; 418; 618), operatively coupled to the fluid containment chamber and configured to cause ejection of drops of fluid through the nozzle apertures in an operating condition of the microfluidic device, wherein:

forming a chamber (17; 117; 217; 317; 417; 617) comprises forming a chamber layer (14; 114; 414; 614) and forming a lateral wall (16; 116; 216; 416) in the chamber layer, the lateral wall having a plurality of indentations (131; 231; 331; 431) and protrusions (130; 230; 330; 430);

forming a plurality of nozzle apertures (34; 134; 434; 623) comprises forming at least one nozzle opening (132; 232; 332; 432) offset with respect to the chamber and intersecting the indentations at intersection areas, thereby forming the nozzle apertures (34; 134; 434), and wherein forming a nozzle layer may comprise:

forming first opening portions (655) in a semiconductor wafer (700);

forming second opening portions (656) in the semiconductor wafer over the first opening portions, the second opening portions having larger area than the first opening portions and extending in prosecution to the first opening portions;

bonding the semiconductor wafer (700) to the chamber layer (614), with the second opening portions facing the chamber; and thinning the semiconductor wafer to expose the first opening portions.

The first opening portions (655) may extend for a partial thickness of a starting wafer (700) of semiconductor material and the process may further comprise:

after forming first opening portions, growing an etch stop layer (702) on the starting wafer, growing a semiconductor layer (706) on the etch stop layer, thereby forming the semiconductor wafer (700), and forming the second opening portions in the semiconductor layer;

wherein thinning the semiconductor wafer may comprise removing the starting wafer up to the first opening portions.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microfluidic device comprising:

a plurality of chambers, the chambers having an elongated shape;

a plurality of fluidic access channels in fluidic connection with the plurality of chambers, respectively;

a plurality of nozzle apertures in fluidic connection with the plurality of chambers, respectively; and a plurality of actuators operatively coupled to the plurality of chambers, respectively, and configured to cause ejection of drops of fluid through the plurality of nozzle apertures in an operating condition of the microfluidic device;

a chamber layer that forms the plurality of chambers;

a nozzle layer on the chamber layer, the nozzle layer forms a plurality of nozzle openings, each of the plurality of chambers being delimited by a lateral wall having a plurality of indentations and protrusions; and the plurality of nozzle openings being offset with respect to the plurality of chambers, with each of the plurality of nozzle openings extending between two adjacent chambers and intersecting indentations of the two adjacent chambers, wherein the plurality of nozzle apertures are formed at intersection areas of the plurality of nozzle opening and the plurality of indentations.

2. The microfluidic device according to claim 1, wherein each of the plurality of chambers has a rectangular or oval base shape.

3. The microfluidic device according to claim 1, wherein each of the plurality of chambers is delimited by a first base, a second base, and a lateral wall, the first and second bases extending along a first and a second direction, respectively, the second direction transverse to the first direction, a length and a width of each of the plurality of chambers extending in the first and second directions, respectively, the lateral wall extending along a third direction, transverse to the first and second directions, a height of each of the plurality of chambers extending in the third direction.

4. The microfluidic device according to claim 3, wherein each of the plurality of chambers has a chamber volume, and the plurality of nozzle apertures are configured to generate, in use, a plurality of drops having a total drop volume, and a ratio of the total drop volume to chamber volume is at least 15%.

5. The microfluidic device according to claim 3, further comprising:

a base body portion, the base body portion forming the first base and accommodating the plurality of actuators, the nozzle layer forming the second base.

6. The microfluidic device according to claim 5, wherein the chamber layer includes a first layer and a second layer extending on the first layer, the first layer delimiting a lower chamber aperture, the second layer delimiting an upper chamber aperture, the lower chamber aperture having a smaller area than the upper chamber aperture, wherein the first layer extends on the base body portion.

7. The microfluidic device according to claim 5, wherein the chamber layer and the nozzle layer are polymeric layers, or the chamber layer is a polymeric layer and the nozzle layer is a silicon wafer.

8. The microfluidic device according to claim 1, wherein the plurality of actuators are heaters.

9. The microfluidic device according to claim 1, wherein the plurality of nozzle openings have a larger area than the plurality of chambers.

10. The microfluidic device according to claim 1, wherein an aspect ratio between a length and a width of each of the plurality of chambers is at least 3:1.

11. A microfluidic device comprising:

a plurality of emitter groups, each emitter group comprising:

a plurality of chambers, the chambers having an elongated shape;

a plurality of fluidic access channels in fluidic connection with the plurality of chambers, respectively;

a plurality of nozzle apertures in fluidic connection with the plurality of chambers, respectively; and a plurality of actuators operatively coupled to the plurality of chambers, respectively, and configured to cause ejection of drops of fluid through the plurality of nozzle apertures in an operating condition of the microfluidic device;

a chamber layer that forms the plurality of chambers;

a nozzle layer on the chamber layer, the nozzle layer forms a plurality of nozzle openings, each of the plurality of chambers being delimited by a lateral wall having a plurality of indentations and protrusions; and the plurality of nozzle openings being offset with respect to the plurality of chambers, with each of the plurality of nozzle openings extending between two adjacent chambers and intersecting indentations of the two adjacent chambers, wherein the plurality of nozzle apertures are formed at intersection areas of the plurality of nozzle opening and the plurality of indentations.

12. The microfluidic device according to claim 11, wherein each of the plurality of chambers is delimited by a first base, a second base, and a lateral wall, the first and second bases extending along a first and a second direction, respectively, the second direction transverse to the first direction, a length and a width of each of the plurality of chambers extending in the first and second directions, respectively, the lateral wall extending along a third direction, transverse to the first and second directions, a height of each of the plurality of chambers extending in the third direction.

13. The microfluidic device according to claim 12, wherein each of the plurality of chambers has a chamber volume, and the plurality of nozzle apertures are configured to generate, in use, a plurality of drops having a total drop volume, and a ratio of the total drop volume to chamber volume is at least 15%.

14. The microfluidic device according to claim 12, further comprising:

a base body portion, the base body portion forming the first base and accommodating the plurality of actuators, the nozzle layer forming the second base.

15. The microfluidic device according to claim 14, wherein the chamber layer includes a first layer and a second layer extending on the first layer, the first layer delimiting a lower chamber aperture, the second layer delimiting an upper chamber aperture, the lower chamber aperture having a smaller area than the upper chamber aperture, wherein the first layer extends on the base body portion.

16. The microfluidic device according to claim 14, wherein the chamber layer and the nozzle layer are polymeric layers, or the chamber layer is a polymeric layer and the nozzle layer is a silicon wafer.

17. The microfluidic device according to claim 11, wherein the plurality of actuators are heaters.

18. The microfluidic device according to claim 17, wherein the heaters within the same emitter group are coupled together.

19. The microfluidic device according to claim 18, wherein the heaters within the same emitter group are coupled between a firing circuit, supplying firing pulses, and ground.

* * * * *